US005602841A

United States Patent [19]
Lebizay et al.

[11] Patent Number: 5,602,841
[45] Date of Patent: Feb. 11, 1997

[54] EFFICIENT POINT-TO-POINT AND MULTI-POINT ROUTING MECHANISM FOR PROGRAMMABLE PACKET SWITCHING NODES IN HIGH SPEED DATA TRANSMISSION NETWORKS

[75] Inventors: Gerald Lebizay, Vence; Jean M. Munier, Cagnes sur Mer; Andre Pauporte, La Colle sur Loup; Victor Spagnol, Cagnes sur Mer, all of France

[73] Assignee: International Business Machines Corporation, Armonk, N.Y.

[21] Appl. No.: 404,800

[22] Filed: Mar. 15, 1995

[30] Foreign Application Priority Data

Apr. 14, 1994 [EP] European Pat. Off. .............. 94480030

[51] Int. Cl.⁶ ................................................ H04L 12/56
[52] U.S. Cl. .................................................... 370/413
[58] Field of Search ........................... 370/58.2, 60, 60.1, 370/61, 79, 94.1, 94.2

[56] References Cited

U.S. PATENT DOCUMENTS

| 5,365,519 | 11/1994 | Kozaki et al. | 370/60 |
| 5,393,280 | 2/1995 | Zheng | 370/60 |

FOREIGN PATENT DOCUMENTS

| 0575281 | 12/1993 | European Pat. Off. | H04L 12/18 |
| 0579567 | 1/1994 | European Pat. Off. | H04L 12/56 |
| 0632625 | 1/1995 | European Pat. Off. | H04L 29/06 |
| 9102420 | 2/1991 | WIPO | H04L 12/56 |

OTHER PUBLICATIONS

Globecom '91, vol. 1, 12–92 NY pp. 104–110.
Int. Journal of Digital and Analog Communication Systems, vol. 5, 1992 pp. 29–37.
Proceedings of the IEEE '92 Custom Integrated Circuits Conf., 5–29, NY, pp. 14.4.1–14.4.4.

*Primary Examiner*—Douglas W. Olms
*Assistant Examiner*—Russell W. Blum
*Attorney, Agent, or Firm*—Stephen T. Keohane; John J. Timar

[57] ABSTRACT

The present invention relates to an efficient point-to-point and multi-points routing system and method for programmable data communication adapters in packet switching nodes of high speed networks. The general principles of this efficiency are the following:

First, data packets are never copied, only packet pointers are copied for each destination: Space in Buffer Memory is saved, the number of instructions is significantly reduced improving the packet throughput (number of packets per seconds that the adapter is able to transmit). and the routing is independant of the packets length.

Second, no overhead is generated by the multi-points mechanism in the real time procedures: the underrun/overrun problems on the ouputs are reduced and the efficiency of the adapter in term data throughput (bits per second) is significantly improved.

Third, each output is processed independently by means of interrupts: lines are managed in real time and lines of different speed or protocol can be supported in parallel.

Fourth, the release of the resources is entirely realized on a non priority mode.

19 Claims, 19 Drawing Sheets

EFFICIENT POINT-TO-POINT AND MULTI-POINT ROUTING MECHANISM FOR PROGRAMMABLE PACKET SWITCHING NODES IN HIGH SPEED DATA TRANSMISSION NETWORKS

TECHNICAL FIELD

The present invention relates to an efficient point-to-point and multi-points routing system and method for programmable data communication adapters in packet switching nodes of high speed networks.

BACKGROUND ART

The telecommunication environment is in full evolution and has changed considerably this recent years. The principal reason has been the spectacular progress realized in the communication technology:

the maturing of fiber optical transmission. High speed rates can now be sustained with very low bit error rates.

the universal use of digital technologies within private and public telecommunications networks.

In relation with these new emerging technologies, the offer of the telecommunication companies, public or private, are evolving:

The emergence of high speed transmissions entails an explosion in the high bandwidth connectivity.

the increase of the communication capacity generates more attractive tariffs.

A higher flexibility is offered to the users to manage their growth through a wide range of connectivity options, an efficient bandwidth management and the support of new media.

Once sampled and digitally encoded, voice, video and image derived data can be merged with pure data for a common and transparent transport.

Abundant, cheap communications means that many potential applications that where not possible before because of cost are now becoming attractive. In this environment, three generic requirements are expressed by the users:

Doing old applications better,

Optimizing communication networks,

Doing new applications.

High Performance Networks

In a first step, T1 backbone networks were primarily deployed with TDM (Time Division Multiplexing) technology to achieve cost savings through line aggregation. These systems easily supported the fixed bandwidth requirements of host/terminal computing and 64 Kbps PCM (Pulse Code Modulation) voice traffic.

The data transmission is now evolving with a specific focus on applications and by integrating a fundamental shift in the customer traffic profile. Driven by the growth of workstations, the local area networks (LAN) interconnection, the distributed processing between workstations and super computers, the new applications and the integration of various and often conflicting structures—hierarchical versus peer to peer, wide (WAN) versus local (LAN) area networks, voice versus data—the data profile has become higher in bandwidth, bursting, non deterministic and requires more connectivity. Based on the above, it is clear that there is strong requirement to support distributed computing applications across high speed backbones that may be carrying LAN traffic, voice, video, and traffic among channel attached hosts, business workstations, engineering workstations, terminals, and small to intermediate file servers. This traffic reflects a heterogeneous mix of:

end user network protocols including Ethernet, Tocken Ring, APPN, FDDI, OSI, ISDN, ATM . . . , and real time (steady stream traffic such as voice and video) and non real time (bursty nature traffic such as interactive data) transmissions.

This vision of a high speed protocol-agile backbone network is the driver for the emergence of fast packet switching networks architectures in which data, voice, and video information is digitally encoded, chopped into small packets and transmitted through a common set of nodes and links. Although low speed links may exist, the availability of fiber optic links will make cost effective to have a few links of high speed rather that many links of low speed. In addition to the high speed backbone, there exists a peripheral network which essentially provides access to the switching nodes. This peripheral network is composed of relatively low speed links which may not use the same protocols or switching techniques used in the backbone. In addition, the peripheral network performs the task of multiplexing the relatively slow end users traffic to the high speed backbone. Thus, backbone switching nodes are principally handling high speed lines. The number of high speed links entering each switching node is relatively small but the aggregate throughput very high in the Giga-bits per second range.

Throughput

The key requirement of these new architectures is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. As example, for meeting a typical 100 ms delay to deliver a voice packet between two end users:

A total of 36 ms might be needed for the packetization and play-out functions at the end points.

About 20 ms is the unalterable propagation delay needed, say, to cross the United States.

There remains 44 ms for all the intra-node processing time as the packet moves through the network. In a 5 nodes network, each node would have about 8 ms for all processing time including any queueing time. In a 10 nodes network, each node would have about 4 ms.

Another way of looking the same constraint is illustrated in FIG. 1: taking a node with an effective processing rate of 1 MIPS (Millions of Instructions Per Second), it is possible to fill a 9.6 kbps line with 1000 byte packets even if a network node must execute 833 000 instructions per packet processed. For a 64 kbps line the node can afford 125 000 instructions per packet. In order to fill an OC24 link, however, our 1 MIPS node could only execute 7 instruction per packet! In the latter case even an effective rate of 10–30 MIPS would allow only 70–200 instructions per packet.

In order to minimize the processing time and to take full advantage of the high speed/low error rate technologies, most of the transport functions provided by the new high bandwidth network architectures are performed on an end-to-end basis. This includes the flow control and error recovery for data, the packetization and reassembly for voice and video. The protocol is simplified:

First, there is no need for transit node to be aware of individual (end user to end user) transport connections.

Secondly high performance and high quality links does not require any more node to node error recovery or retransmission. Congestion and and flow control are managed at the access and end points of the network connections reducing both the awareness and the function of the intermediate nodes.

Packet size

Transmission of real time data, like voice or video packets, which must be delivered to the receiver at a steady, uniform rate (isochronous mode) requires the use of short packets. In another side, pure data does not have any problem with transit delay. They are generated in a very bursty and non deterministic manner. The longer packet are, the fewer packets per second must be switched for a given data throughput. In order to take full advantage of the different data packet transmission systems, the data transfer across the network must be done with packets of nearly the same size as the user packets without processing them into artificial lengths. As opposed to solely data networks or solely voice or video networks, the high speed network architectures have to support a plurality of heterogeneous transmission protocols operating with variable length packets.

Connectivity

In a high speed network, the nodes must provide a total connectivity. This includes attachment of the customer's devices, regardless of vendor or protocol, and the ability to have the end user communicate with any other device. Traffic types include data, voice, video, fax, graphic, image. The node must be able to take advantage of all common carrier facilities and to be adaptable to a plurality of protocols: all needed conversions must be automatic and transparent to the end user. For example, a high speed node must not have any dependencies on the existence of SNA (System Network Architecture) equipments on a user network. It has to be able to offer a similar level of service in a SNA environment as in a non-SNA environment made of routers, Private Branch eXchanges (PBXs), Local Area Networks (LAN) . . . .

Key Requirements

The efficient transport of mixed traffic streams on very high speed lines means for each communication node of the network a set of requirements in term of performance and resource consumption which can be summarized as follows:

- a very short packet processing time,
- a very high throughput,
- an efficient queue and buffer management,
- a limited number of instructions per packet,
- a minimum impact of the control flow on the user traffic, and
- a very large flexibility to support a wide range of connectivity options.

The high bandwidth dictates the need of specialized hardware to support very fast packet handling and control protocols, and to satisfy the real time transmission needs of the voice and video traffic. The processing time being the main bottleneck in high speed networks, most of the communication nodes today are built around high speed switching hardware to off-load the routing packet handling and routing functions from the processor.

However, on equal performances, a software approach represents the most adequate solution for each node to meet the connectivity and flexibility requirements and to optimize the manufacturing and adaptation costs. The line adapters, are based on a common hardware design and are configured by means of a specific programming to execute either the access point or inter nodal transport functions. The adaptability of the adapters to support different access protocols and data streams—Frame Relay, HDLC (High level Data Link-Control), CBO (Continuous Bit Operations), ATM (Asynchronous Transfer Mode), . . .—is provided by logical components called Access Agents. Such logical associations Adapter/Access Agent are specified by software, providing a very large flexibility at a reduced cost. Each line adapter is automatically configured at system initiation according to:

the adapter function, and the access protocol.

Programmable High Performance Communication Nodes

The throughput of a communication adapter is defined as the total time required to handle a data packet from the input to the output. However, the packet size being application dependent, two measures are currently used to evaluate the performances of adapters:

first, the number of packets of fixed length the adapter is able to handle in a second (packet throughput), second, the number of bits per second the adapter is able to transmit in case of infinite packet length (data throughput).

The performances depend on the hardware and on the processor capabilities but the main throughput limiting factor is the packet processing time and this processing time is directly related to the number of instructions required to handle a packet. The operations on the packets can be divided in two categories:

the background process with the operations of packet routing, assembling—disassembling, formatting, bandwidth management, priority, . . . . This process is designed according to the adapter function, but in the same application, the background process is identical for all packets independently of their size.

the buffering process with the interrupt routines. This operation is generic for all adapter types. The processing time required for this operation is directly proportional to the packet length.

The interrupt routines are the way real time is supported by the processor. They must be as short as possible to avoid the overrun on the input device and the underrun on the output device. They commands the performance of the adapter in term data throughput (bits per second). For packets of infinite length, the background process disappears and the throughput bottleneck is the interrupt response time which depends of the queuing and dequeueing operations.

In another way, to maximize the packet throughput (number of packets per seconds that the adapter is able to transmit), the number of instructions required by the background process must be reduced to a minimum.

Non published European patent application 93480087.1 (IBM docket FR993027) entitled *Programmable High Per-*

*formance Data Communication Adapter for Packet Transmission Networks* (prior art under Article 54(3) EPC), which content is herein incorporated by simple reference, discloses a high performance packet buffering method and system in a programmable data communication adapter. The adapter includes a programmable processor, for receiving and transmitting data packets of fixed or variable length. The system is designed to optimize the queueing and dequeueing operations and in particular to minimize the number of instructions to manipulate the packets. It is characterized in that it comprises:

means for storing data packets in buffers, means for identifying said data packets in the buffers means for queueing in a local memory the packet identifiers in a single instruction, means for dequeueing from the local memory the packet identifiers in another single instruction, means for releasing the buffers.

Each instruction comprises up to three operations executed in parallel by said processor:

an arithmetical and logical (ALU) operation on the packet identifiers, a memory operation on the local memory, and a sequence operation.

SUMMARY OF THE INVENTION

An efficient point-to-point and multi-points routing system and method for data communication adapters in packet switching nodes of a high speed network is disclosed. The general principles of the present invention can be summarized as follows:

data packets are never copied during their routing through the adapter, only packet pointers are copied for each destination, each output is processed independently on a priority mode, no overhead generated by the multi-points routing in the interrupt procedures, release of the resources on a non priority mode (background procedure).

DESCRIPTION OF THE DRAWINGS

FIG. 8b shows a graphical representation of a Multicast Tree Routing Field in the header represented in FIG. 8a.

DESCRIPTION OF THE PREFERRED EMBODIMENT OF THE INVENTION

Figure 1:
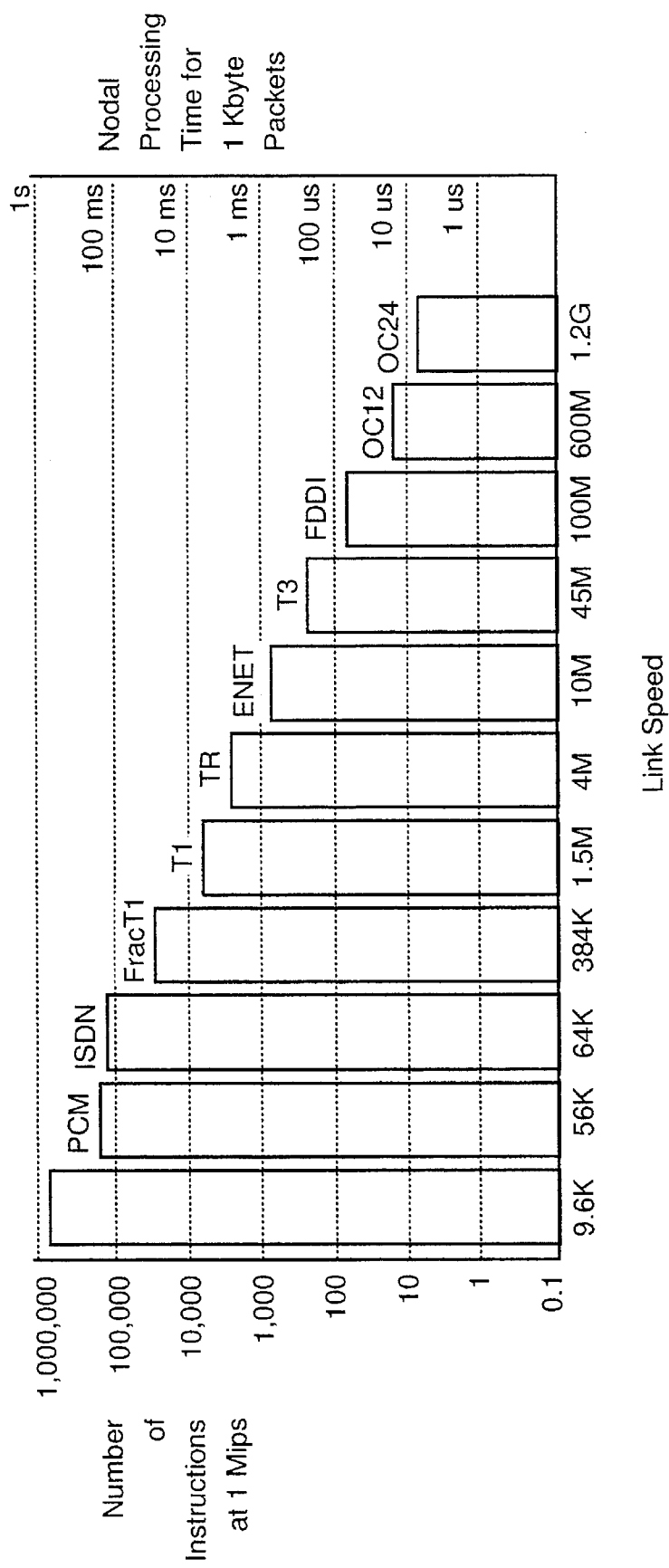
FIG. 1 shows the processing times (or number of instructions per second) required in function of the different line throughputs supported by the present invention.
Figure 2:
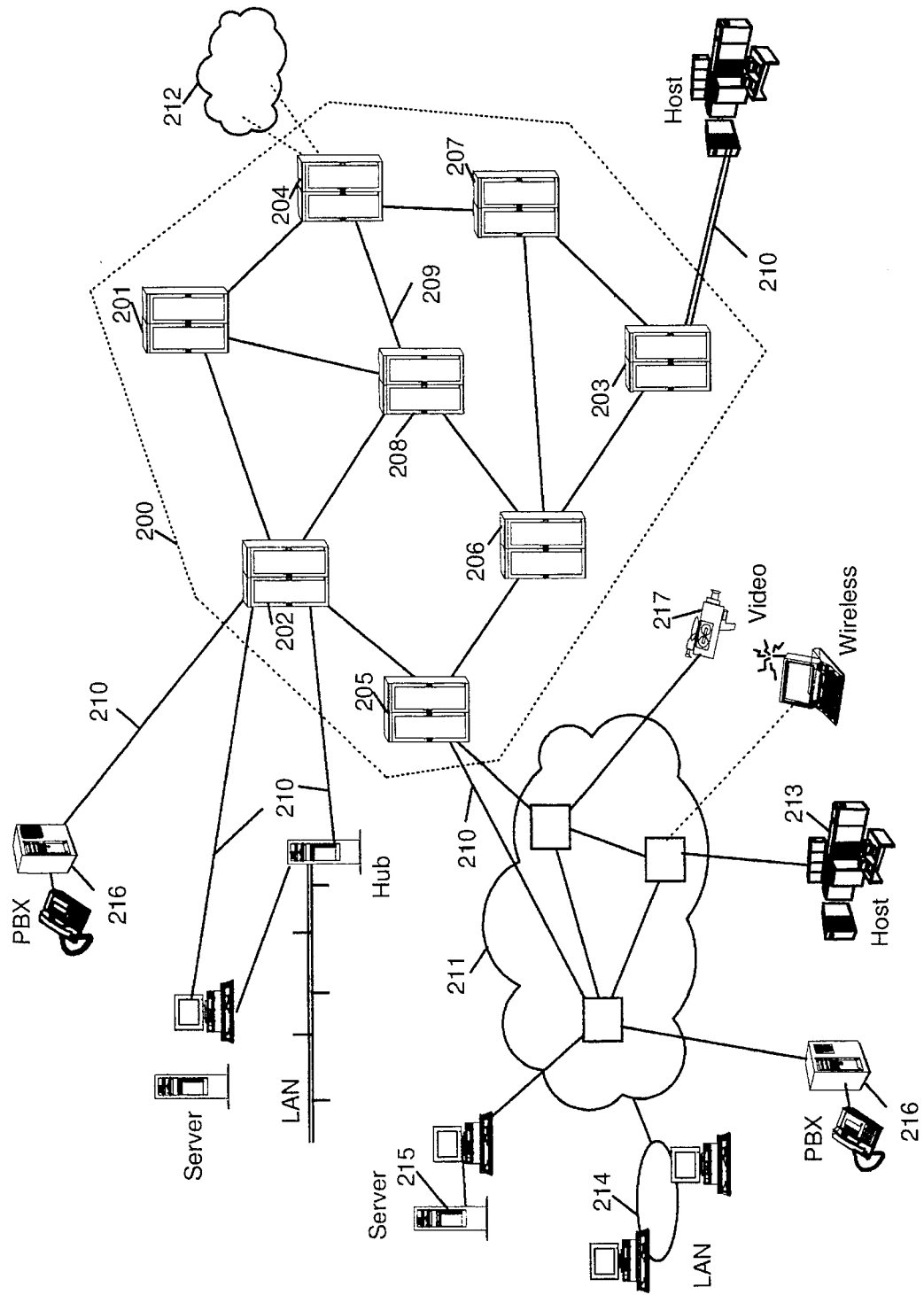
FIG. 2 shows a typical model of high speed packet switching network including the access and transit nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as Enterprise Servers (213), user groups using workstations or personnel computers attached on LAN (Local Area Networks 214), applications servers (215), PBX (Private Branch eXchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

High Speed Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch eXchange (PBX), an application server and a hub through three Ports and communicates through the network by means of the adjacent Transit Nodes 201, 208 and 205.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Figure 8A:
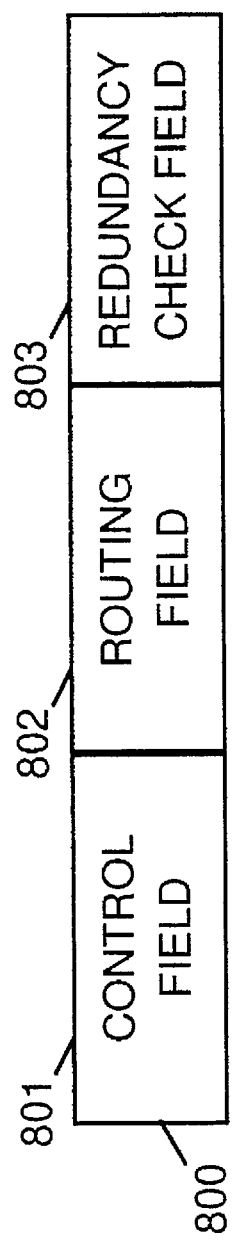
FIG. 8a shows a graphical representation of a typical header for packets transmitted in a network such as represented in FIG. 2.

Each Port is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This network layer header (800) shown in FIG. 8a is made of Control (801), Routing (802) and Redundancy Check (803) Fields.

The Control Fields (801) include, among other things, an encoded identification of the protocol to be used in interpreting the Routing Field.

The Routing Fields (802) contain all the information necessary to route the packet through the network (200) to the destination End Node to which it is addressed. These fields can take several formats depending on the routing mode specified The Redundancy Check Fields (803) are used to check for errors in the header itself. If an error is detected, the packet is discarded.

Routing Points

Figure 3:
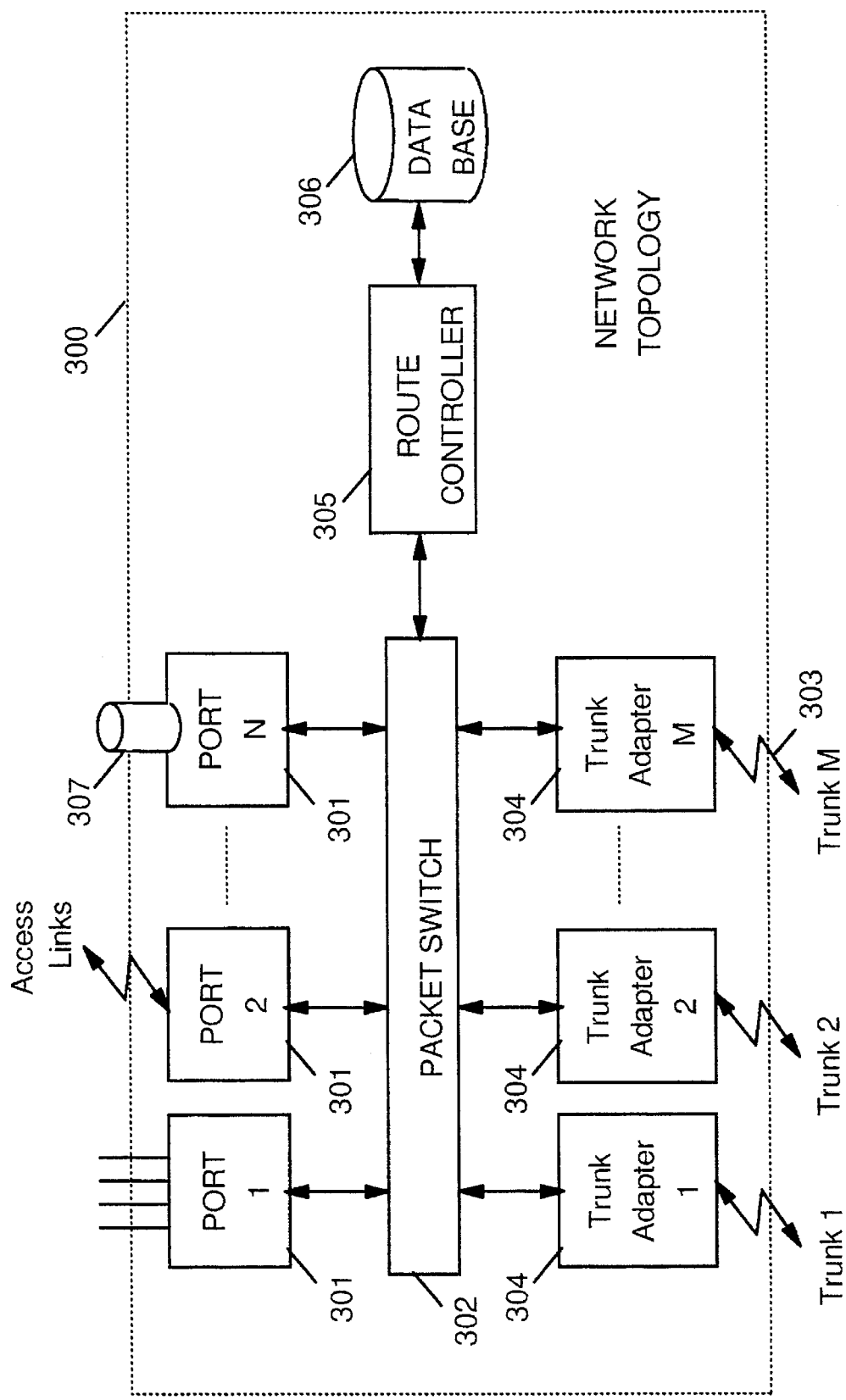
FIG. 3 describes a high speed Routing Point according to the present invention.

FIG. 3 shows a general block diagram of a typical Routing Point (300) such as it can be found in the network Nodes (201 to 208) illustrated in FIG. 2. A Routing Point comprises a high speed packet Switch (302) onto which packets arriving at the Routing Point are entered. Such packets are received:

from other nodes over high speed transmission links (303) via Trunk Adapters (304).

from users via application adapters called Ports (301).

Using information in the packet header, the adapters (304, 301) determine which packets are to be routed by means of the Switch (302) towards a local user network (307) or towards a transmission link (303) leaving the Node. The adapters (301 and 304) include queuing circuits for queuing packets prior to or subsequent to their launch on the Switch (302).

The Route Controller (305) calculates the optimum routes through the network (200) so as to minimize the amount of network resources used to complete a communication path and builds the header of the packets generated in the Routing Point. The optimization criteria includes the characteristics of the connection request, the capabilities and the utilization of the Trunks in the path, the number of intermediate nodes . . . . All the information necessary for the routing, about the nodes and transmission links connected to the nodes, are contained in a Network Topology Database (306). Under steady state conditions, every Routing Point has the same view of the network. The network topology information is updated when new links are activated or new nodes added to the network. Such information is exchanged by means of control messages with all other Route Controllers to provide the necessary up-to-date information needed for route calculation (such database updates are carried on packets very similar to the data packets between end users of the network). The fact that the network topology is kept current in every node through continuous updates allows dynamic network reconfigurations without disrupting end users logical sessions The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Control Point Spanning Tree

Associated with networks are several network control functions: network Spanning Tree maintenance, Topology Database, Directory, Path Selection, Bandwidth Management and Reservation, and Congestion Control. Preferably, every node has a set of the foregoing network control functions called its Control Point (CP) that the node uses to facilitate the establishment of connections between user applications.

Figure 7:
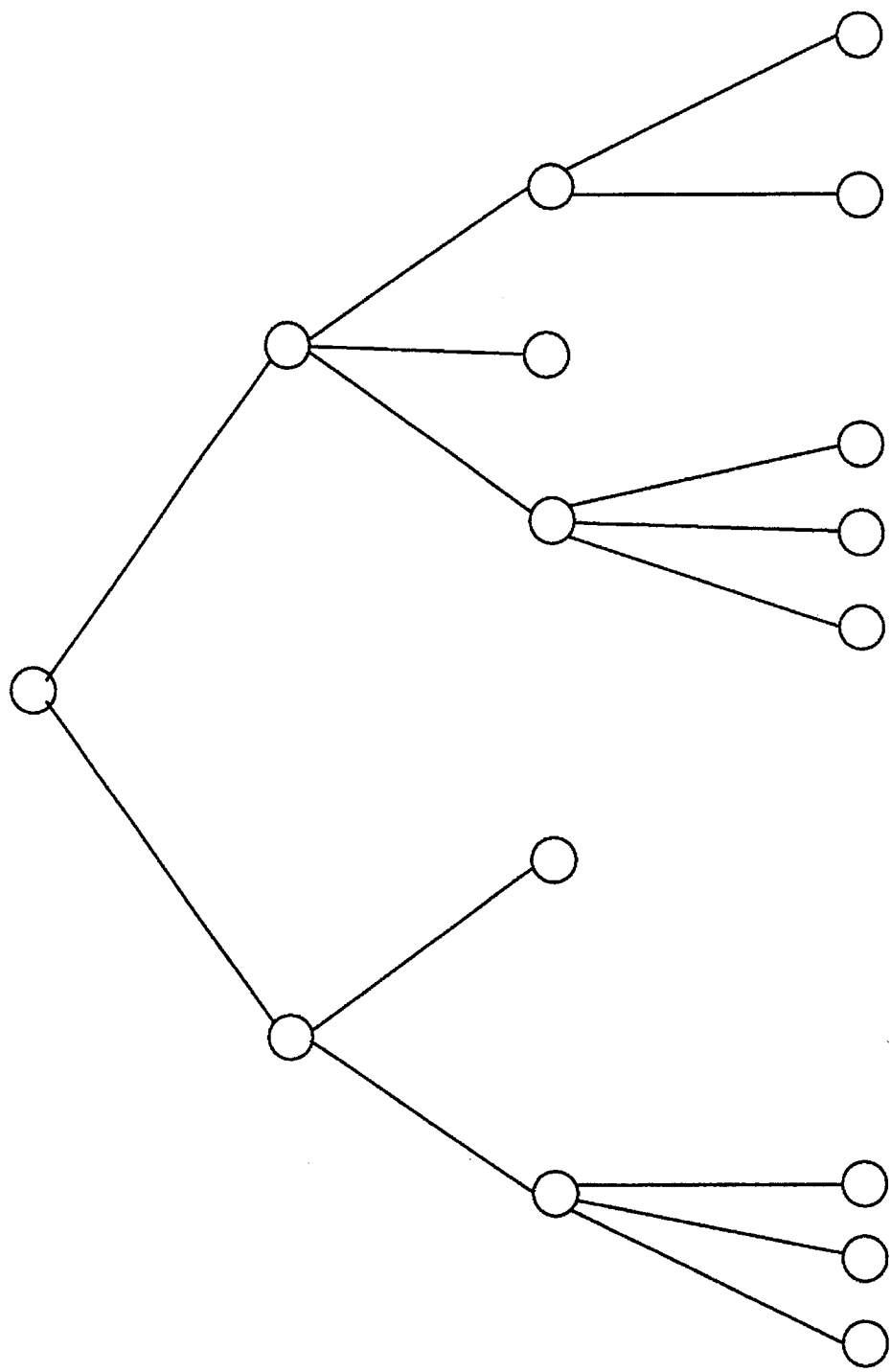
FIG. 7 illustrates the Control Point Spanning Tree.

The main purpose of the Control Point Spanning Tree is to ensure a communication and distribution mechanism for all network control functions in the nodes of a high speed network. It (logically) joins together the Control Points (305) if the nodes are in a (physically) connected portion of the network. As illustrated in FIG. 7 a tree is a pattern of connections with no loop, the term "spanning" means that the tree spans (connects) all of the nodes. Once formed, the Control Point Spanning Tree is the principal system used to disseminate control information such as Topology Database (306) updates. This mechanism is fundamental to minimize delays due to intermediate node processing.

First, an intermediate node will get each control message exactly once on the tree, and second, the message can be forwarded along outgoing links of the tree before the intermediate node has even looked at the packet contents.

A distributed algorithm creates and maintains the Control Point Spanning Tree in presence of node and link failures and helps to minimize the impact of the increased control flows that result when the network grows.

Routing Modes

The routing within the network presents two aspects:

1. Determining what the route for a given connection shall be.
2. Actually switching the packet within a switching node.

There are many methods of determining a route through a network. For very high throughput, once the route selected, the critical item is that the switching elements must be able to route an incoming packet in a very short portion of time. Driven by the requirements to keep transit node processing at a minimum, the transport services are designed to operate on an end-to-end basis so there is no hop-by-hop error recovery or retransmission envisioned for high speed, high performance (low error) links. There is also no need for transit nodes to be aware of individual transport connections.

Data packets are routed and queued in the transit nodes according to the routing information contained in the header. Several routing modes can be used in high speed networks (refer to an *Introductory Survey* (pages 116 to 129)—GG24-3816-01 ITSC Raleigh June 1993). However, in most of the case, packets using different modes can share the same data transmission facilities.

To classify the different transport type, we can consider on one side the point-to-point transmissions on the other side the multi-pointss transmissions. As illustrated by the following examples, each routing mode has its particular indented use and includes advantages and disadvantages that complement the other modes.:

Point-to-Point Transmission

Source Routing

The Source Routing is a particular implementation of the distributed routing for connectionless networks. The The source node (or access node) is responsible for calculating the route the packet must take through the network.

Each packet includes in its routing field a list of the labels of all links through which the packet will pass as it moves across the network. The Source Routing requires no connection setup activity in intermediate nodes and supports true datagram services.

Label Swapping

This routing mode is used in connection oriented networks. Each packet sent on the link has a header which includes an arbitrary number identifying which logical connection that this packet belongs to. Label Swapping requires that connection tables be set up and maintained dynamically in each node. Due to the low packet overhead, this technique is particularly adapted to the transmission of very short packets (for example real-time voice connections).

Multi-Points Transmission

Multicast allows one entity to communicate with multiple entities. An efficient multicast mechanism provides packet delivery to a set of users without having to broadcast to all users in the network or having to "unicast" separate copies of packets to each user of a group.

Multicast Tree Routing

Multicast Tree Routing is supported by the ability of each node to recognize that a particular label represents a predefined tree and to forward the received packet along all the outbound links associated with that tree. This is the basic routing mechanism that underlies both the fundamental Control Point Spanning Tree and any individual trees that can be established, pruned, and removed dynamically in a network. The Control Point Spanning Tree greatly reduces the negative effect on performance that network control flows could have in a high speed network. Tree routing on other Multicast Trees can be fundamental to supporting, for example, multi-attached LANs, or specific applications like video conference.

Remote Access to a Multicast Tree

Remote Access to a Broadcast Tree is a straightforward combination of the two routing modes: Source Routing and Multicast Tree Routing. The routing field includes several Source Routing labels followed by a tree address label. This allows a node that is not a member of a tree to route packets to nodes that are tree members. This technique is described with more details in European patent application 93480059.0 filed May 19th 1993 entitled *Method and Apparatus for Routing Packets in Packet Transmission Networks*.

Multicast Mechanism

The Multicast Tree Routing provides a broadcast capability over a preselected tree that can connect multiple nodes. Any member of a multicast group can send a packet which will be forwarded to all other member of the group. A Multicast Tree is simply identified, in the Routing Point, by a reference in the Topology Database. Different trees can coexist in the same network. One internal use of a Multicast Tree is to join all the Control Points of a network (Control Point Spanning Tree) for maintaining in each Topology Database a true image of the network configuration. This broadcast mechanism can also be used to address subset of network users (like a closer user group).

Figure 8B:
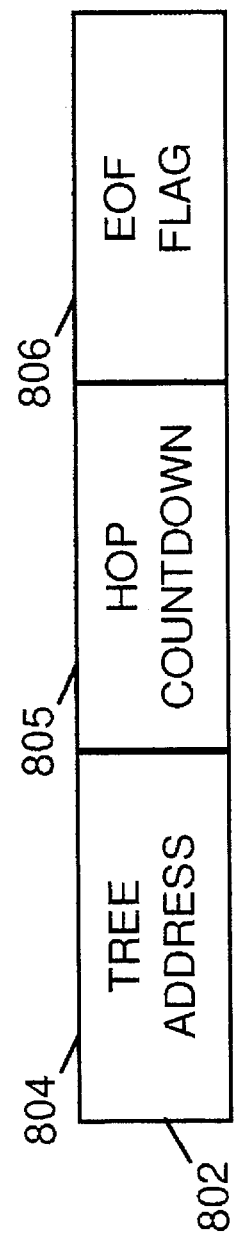

As illustrated in FIG. 8b, a Multicast Tree is identified by a tree address (804) which is part of the routing field (802) of packets to be sent on the tree. Unlike the Source Routing labels which are uniquely preassigned to individual links within each node, the tree address is assigned to all links that are to be part of a tree at the time that the tree is set up. The tree address must be unique to one and only one tree across all nodes over which the tree passes. When a packet addressed to a Multicast Tree arrives at a node over a link, any links in that node that are configured for that tree address will forward this packet. In this manner, copies of the packet flow across the network, along each link configured as a branch of the tree, with one and only one copy arriving at each node that is part of the tree. A Hop Countdown Field (805) is included in the Multicast Tree Routing Field (802) which is decremented at each retransmission of the packet. When the hop countdown is equal to zero, no further retransmission is permitted and an error condition is assumed. The routing field is terminated by and End Of Field (EOF) flag (806).

Any node can be simultaneously be a member of a plurality of different trees and hence the tree addresses assigned to overlapping multicast trees must be unique. Nodes can be added or deleted from a Multicast Tree simply by adding or removing the tree address from the links leading to the node to be added or deleted. A more detailed description is disclosed in European patent application 93480060.8 filed May 19th 1993 entitled *Multicast Com-*

*munication Tree Creation and Control Method and Apparatus.*

Ports and Trunk Adapters

Adapters Function

Ports are located at the boundary of the high speed network. They allow terminal equipments to exchange information through the high speed network without the need for knowing the specific high speed protocol used. The main function of the Ports are:

receiving foreign protocol data units from an external resource and forwarding them as high speed packets over the network to a target Port, and converting high speed packets back to foreign protocol data units and sending them to the target resource, controlling the bandwidth.

Note: the source and target Ports may be located in the same node.

Trunks are the links between the high speed network nodes. They carry high speed packets. Each Trunk manage its link bandwidth and link status. A critical task of the Trunks is the management of traffic priorities and allocation of internal buffers to reduce delay and congestion.

In addition, there is a special type of adapter called Route Controller Adapter (305) which:

communicates with the other adapters (301, 304) through the Switch (302), implements the centralized functions of the Route Controller such as the topology, the path selection . . . , establishes, maintains and cancels end-to-end high speed connections.

Adapters Architecture

Several techniques for designing said Ports, Trunk and Route Controller Adapters, to obtain more or less flexible and efficient transmission systems. Most of the adapters today are built around a specialized hardware depending on the function and protocol of the connected links.

The present invention, to satisfy the previously enumerated connectivity and flexibility requirements, provides a software solution based on a common hardware structure. Port and Trunk Adapters present the same architecture and their functional differentiation is realized through a specific programming. However, even using the most efficient general purpose microprocessor today available on the market, the experience shows that it is very difficult to reach the desired level of performance in term of number of switched packet per second. This is the reason why the control of each adapter has been shared between two processors: a Specific Purpose Processors (SPP, 406, 412), optimized for the packet switching and a General Purpose Processor (GPP, 409), the first dealing with the packet to be switched, the critical processing in term of performance, and the second with the adapter management.

Figure 4:
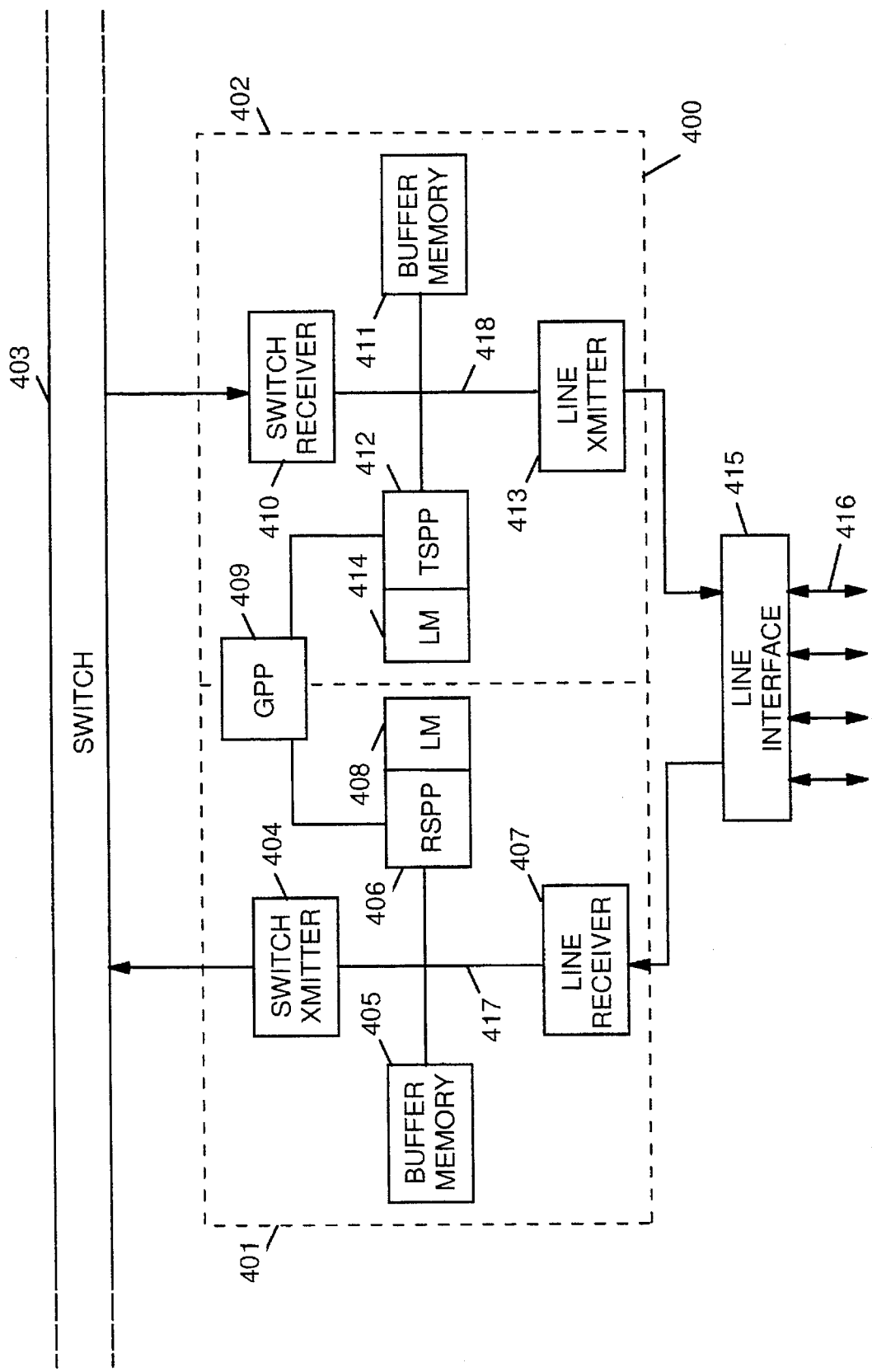
FIG. 4 shows a programmable high performance adapter according to the present invention.

As shown in FIG. 4, each adapter (400) comprises the following logic components:

1. A General Purpose Processor (GPP, 409) whose programming depends of the selected Port or Trunk Adapter function. The GPP implements the adapter control operations.

2. A Receive Adapter (401) for implementing three functions:

the checking of the high speed packets header.

the traffic discrimination according to the routing mode specified in the header of every incoming packet, the routing of the incoming packets through the Switch (403) with the appropriate header.

The Receive Adapter includes:

a. a Line Receiver (407) for handling the data movements between a Line Interface (415) and a Receive Buffer Memory (RBM, 405).

b. a Receive Buffer Memory (RBM, 405) to temporarily store users data packets.

c. a Receive Specific Purpose Processor (RSPP, 406) based on a specialized microprocessor comprising a Local Memory (LM, 408). The RSPP handles the received steady state packet flow and forwards the control packets to the General Purpose Processor (409).

d. a Local Memory (LM, 408) used by the RSPP (406) as work space.

e. a Switch Transmitter Adapter (404) for handling the data flow transferred from the buffer Memory (RBM, 405) under the control of the Receive Specific Purpose Processor (406)

segmenting this flow in fixed length cells and, generating an appropriate switch routing header 3. a Transmit Adapter (402) for implementing the following functions:

the reception of the data flow from the Switch (403), the checking of the cells header.

the reassembly in packets (Port), the Trunk functions (Trunk adapter), the routing.

The Transmit Adapter includes:

a. a Switch Receiver (410) for handling the flow coming from the Switch (403) and transferring it to the Buffer Memory for reassembly.

b. a Transmit Specific Purpose Processor (XSPP, 412) similar to the Receive Specific Purpose Processor (406). The XSPP handles the steady state data and forwards the control flow to the General Purpose Processor (GPP, 409).

c. a Line Transmitter Adapter (413) for handling the data movements between the Buffer Memory (411) and the Line Interface (415).

The adapters are connected on one side on the packet Switch and on the other side on the Line Interfaces:

The Line Interfaces (415) are used to adapt the Port and Trunk Adapter physical interfaces to the appropriate media.

The packet Switch (302, 403) allows the Route Controller (305) and the different Ports (301), Trunk Adapters (304) to communicate.

Data Flow Control

Figure 5:
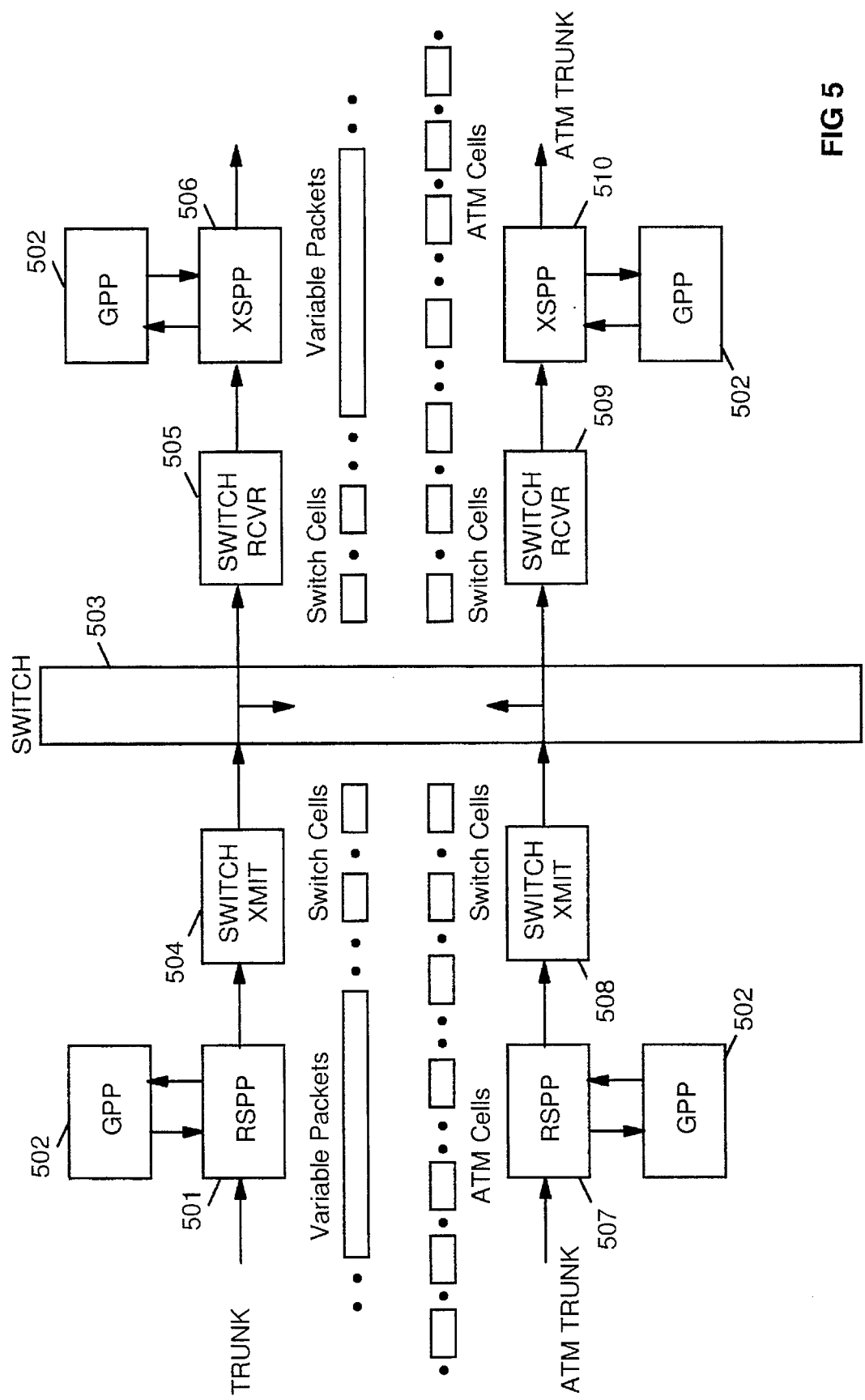
FIG. 5 represents the receive and transmit data flows in a Trunk Adapter.

The receive and transmit data flows in the Trunk Adapters are represented in FIG. 5. In a proprietary high speed network with packets of variable lengths, the receive process involves the steps of:

1. Line Receiver, Buffer Memory, Specific Purpose Processor (501) system a. receiving the packets from the line, b. checking the packets header and in case of error discarding the packets, c. processing the information contained in the packets header according the routing mode, d. routing the control messages towards the General Purpose Processor (GPP, 502)

e. encapsulating the packets with a specific switch header in function of the destination adapter, f. forwarding the packets and the GPP (502) control messages to the Switch Transmitter Adapter (504), 2. Switch Transmitter Adapter (504)

a. segmenting the packets in cells of fixed length adapted to the Switch (503), b. generating an error check field to ensure the integrity, of the switch header during the transmission of the cells over the Switch (503).

The transmit process, as for it, comprises the steps of:

1. Switch Receiver Adapter (505)

a. receiving the cells from the Switch (503), b. checking the switch header and, in case of error, discarding the cell, 2. Line Receiver, Buffer Memory, Specific Purpose Processor (506) system a. reassembling the data packets, b. forwarding the control packets to the General Purpose Processor (502), c. encapsulating the packets with a routing header, d. receiving control packets from the GPP (502), e. queueing data and control packets in the appropriate queues, f. handling the outgoing packets with priority given to real time data (and then to non real time data).

It is possible to design the adapters to work either in a a proprietary environment with packets of variable length, or in a standard mode such as ATM (Asynchronous Transmission Mode) with short cells of fixed length, or in both where appropriate. In this last case, for performance purpose, cells routed on the switch are identical or similar to these defined in the ATM protocol with as result:

the elimination of the packets segmentation and reassembly steps in the Switch Transmitter (508) and Receiver Adapters (509), a simplification of the switch header processing in the Specific Purpose Processor (507, 510).

Adapter Functional Structure

The present invention deals with the relationships between the Line Receiver/Transmitter, the Buffer Memory, the Specific Purpose Processor, and the Switch Adapter and in particular with the handling of the data flow in a way to optimize the throughput and the processing time inside the adapters. More specifically, the invention relates to a very high performance system for queuing, dequeueing and distributing data packets on external links.

The communication adapters are based on the following principles:

the Specific Purpose Processor is designed to minimize the number of operations necessary to manage the steady state data flow.

data packets and control data are managed separately in two distinct memories respectively the Buffer Memory and the Local Memory.

the data packets buffering, the queueing, dequeuing, the routing and multicasting mechanisms are identical for all Ports—Trunk Receive and Transmit adapters.

According to these considerations, the following conventions will be used to describe the invention:

The device which reads in the Buffer Memory and the device which writes into the Buffer Memory are designated respectively by IO1 and IO2. That means:

in the receive side of the adapter, IO1=Switch Transmitter and IO2=Line Receiver in the transmit side of the adapter, IO1=Line Transmitter and IO2=Switch Receiver.

In the same way:

an input data stream goes from the switch or external line (IO2) to the Buffer Memory.

an output data stream goes from the Buffer Memory to the switch or external line (IO1).

Furthermore:

The meaning of "packet" is application dependent. It may be applied, for example, to an SDLC-frame from a Port, to a proprietary packet format from a Trunk, or to a cell received from an ATM Trunk. The term "packet" that will be used in the following paragraphs will not refer to a precise data unit format.

Data Structures

Buffers, Packets, Queues Structures

Figure 6:
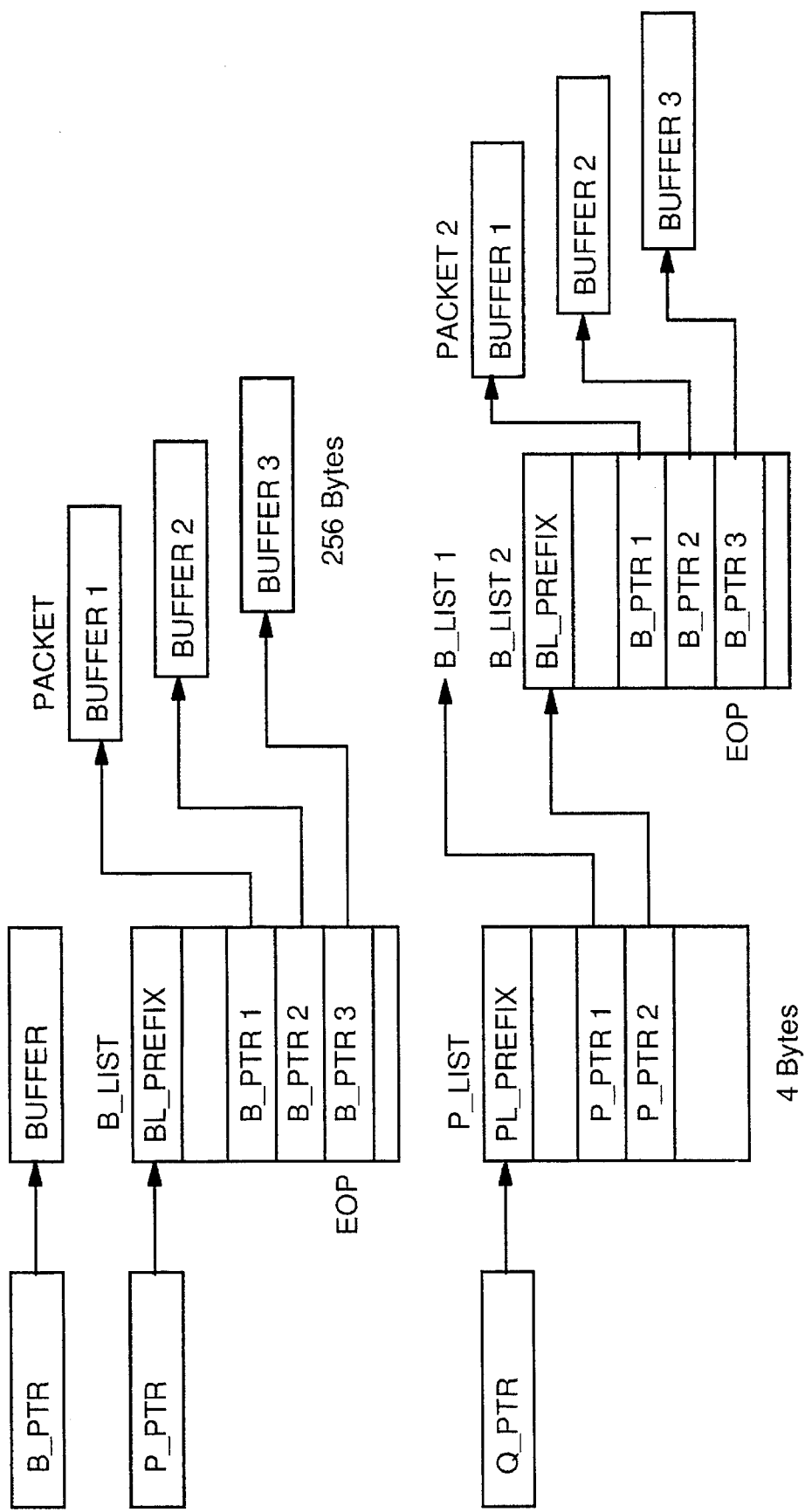
FIG. 6 illustrates the buffer, packet and queue structures according to the present invention.

Data packets are stored in the Buffer Memory (BM) while control data are managed directly by the Specific Purpose Processor (SPP) in the Local Memory (LM). The basic unit of memory that can be allocated to an input (Line/Switch Receiver (IO2)) or output device (Line/Switch Transmitter (IO1)) is a buffer of fixed length. As illustrated in FIG. 6, each of these buffers is represented in the Local Memory by a pointer called Buffer Pointer (B_PTR). A pointer is a generic term to identify a logical data structure (buffer, packet, queue . . .) stored in the Buffer Memory. The storage of a packet requires one or several buffers. These buffers are stacked together using a list of pointers (B_LIST) which is itself represented by a Packet Pointer (P_PTR). A list of Packet Pointers (P_LIST), identified by a Queue Pointer (Q_PTR), designates a queue of several packets.

List Prefix

Each list, representing a specific packet or a queue structure, is preceded by a Prefix used for storing any type of information related to the data the structure contains. In Buffer Lists, the Prefix contains information related to the routing of the packet:

the packet header the date of the packet reception the packet length

Figure 11:
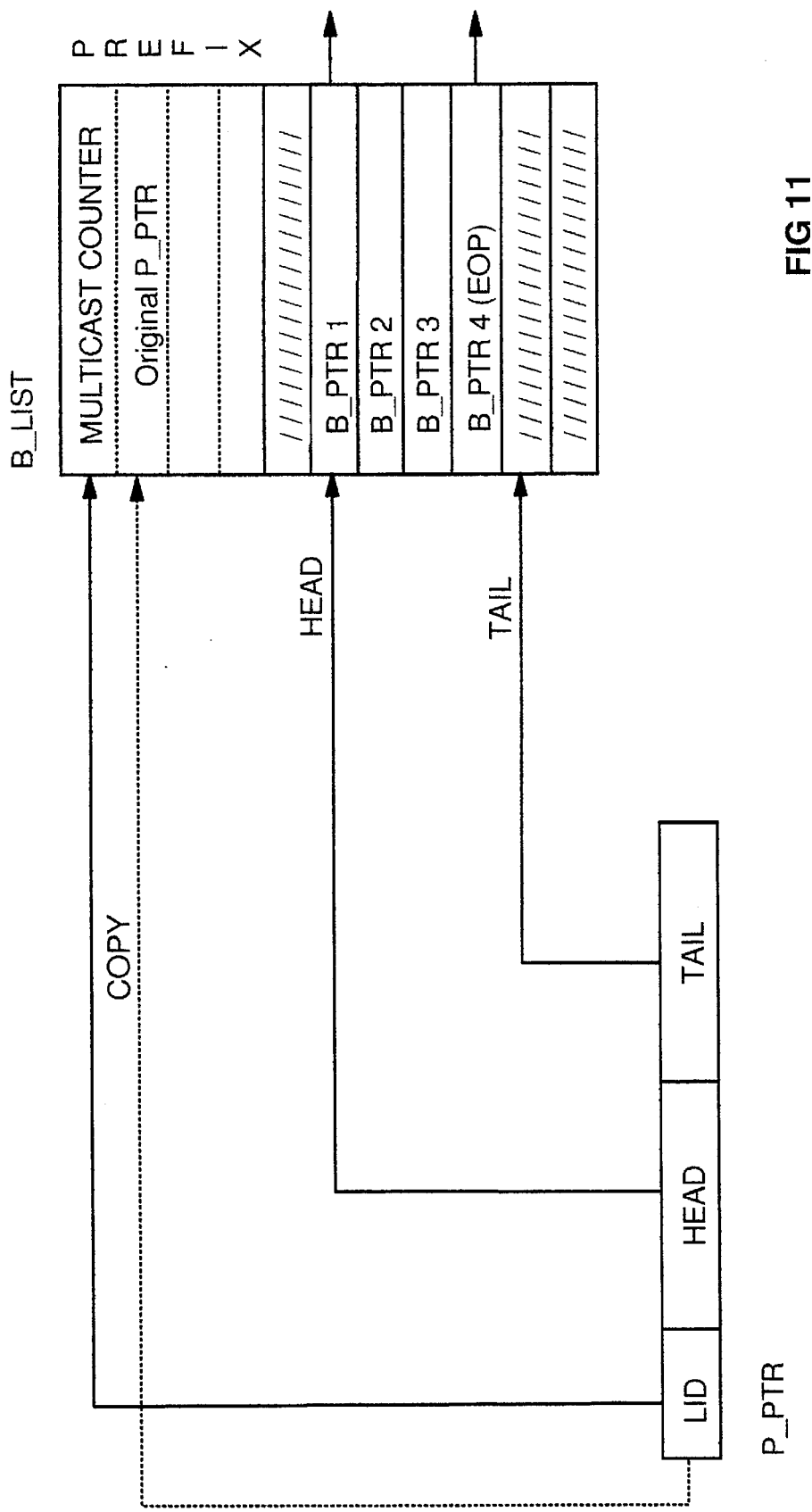
FIG. 11 represents the Buffer List structure of a packet supporting the multicasting routing according to the present invention.

All the processor operations on the packet header are realized in the the Local Memory (LM) without having to access to the data stored in the Buffer Memory (BM). Furthermore, when the processor (SPP) is working on the Local Memory, the DMA operations on the Buffer Memory are not disrupted. The result is a more efficient routing process and memory management. As illustrated in FIG. 11, the support of the multicasting mechanism is realized by means of specific fields in the Buffer List Prefix of a each packet:

a Multicast Counter (MCC)

The counter is initialized according to the number of outputs. The intitial counter value is one or superior to one depending on if the packet is intended to be transmitted to a single (MCC=1: Point-to-point Routing Mode) or to multiple destinations (MCC>1: Multi-points Routing Mode). The counter value is decremented each time the packet to multicast is transmitted to an output. When the counter value is equal to zero, the routing process is terminated and the resources attached to the packet can be released.

a copy of the Packet Pointer (P_PTR)

The original Packet Pointer, with the initial HEAD (identification of the first Buffer Pointer in the list) and TAIL (identification of the next Buffer Pointer in the list) values, is saved in the Buffer List Prefix to allow, at the end of the transmission, the complete release of all Buffers attached to the packet.

Packet Segmentation

To facilitate the memory management, the lists used for packets and queues are of fixed length. Packets which are bigger than the buffer list can contain, are segmented. This method allows the lists (B_LIST) not to be sized at the maximum packet length.

Buffer Pointers

Buffers need not to be full and the data may start and end at any place. For example, it is possible to reserve the first bytes of a buffer to include a header a posteriori. A Status Field (SF) is used in the last Buffer Pointer of a list to designate an End Of Packet (EOP). The general format of a Buffer Pointers is described in European patent application 93480087.1 (IBM docket FR993027) entitled *Programmable High Performance Data Communication Adapter for Packet Transmission Networks*

List Pointers

Figure 9:
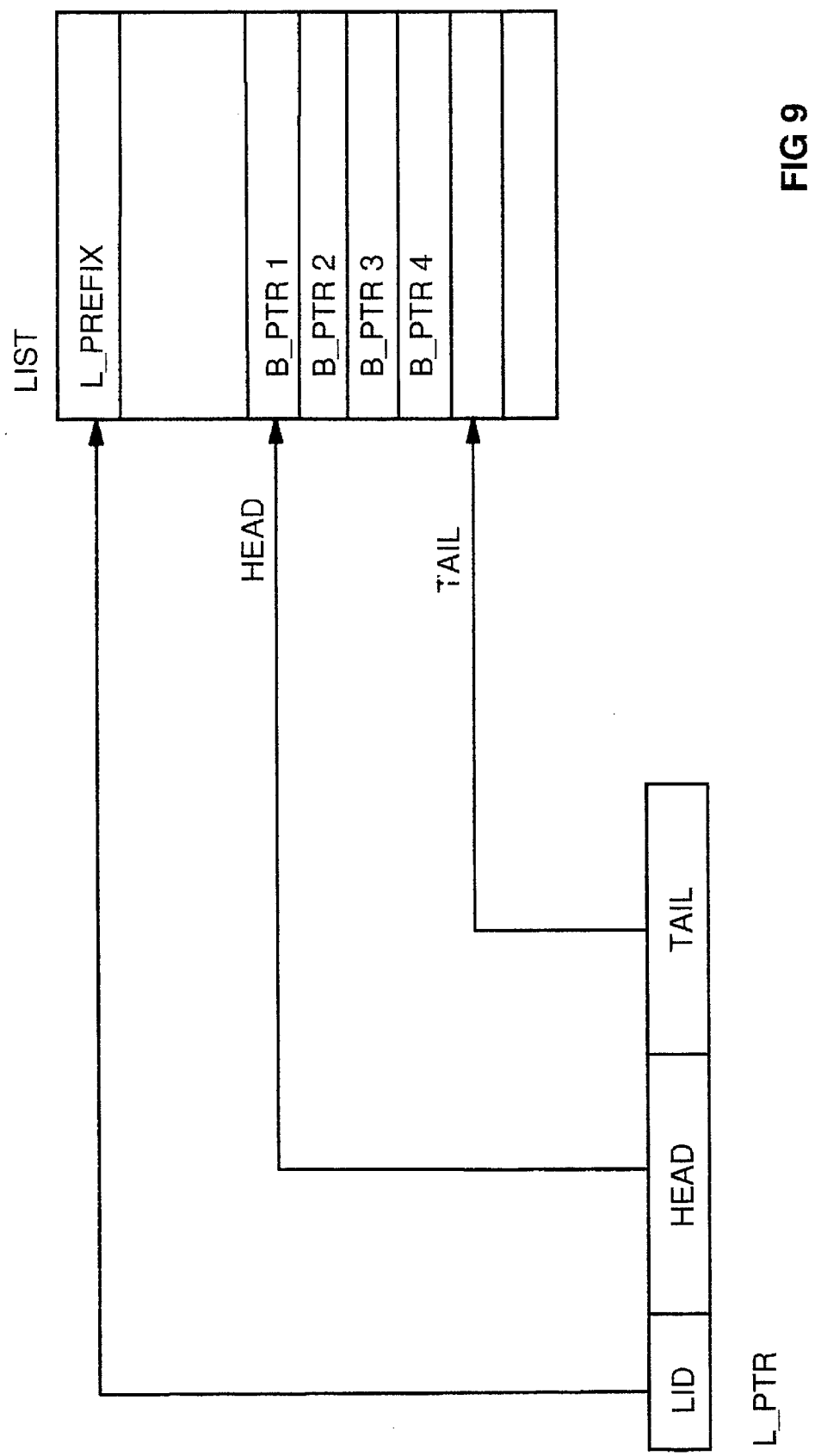
FIG. 9 represents the List Pointer structure according to the present invention.

Referring to FIG. 9, the List Pointer format consists of three fields:

the List IDentifier (LID): identification of the list, the HEAD: identification of the first pointer of the list, the TAIL: identification of the next pointer to attach to the list.

The queuing process comprises the steps of:

testing if list is full (if INCREMENTED(TAIL)=HEAD).

storing the pointer at the address identified by the TAIL field in the pointer list identified by the LID field, incrementing the TAIL field of the List Pointer, The dequeueing process comprises the steps of:

testing if the list is not empty (if HEAD not equal to TAIL).

reading the pointer at the address identified by the HEAD field in the pointer list identified by the LID field, incrementing the HEAD field of the List Pointer when list is not empty.

This queueing and dequeueing method is described with more details in European patent application 93480087.1 (IBM docket FR993027).

Free Buffer List (FBL)

Figure 12:
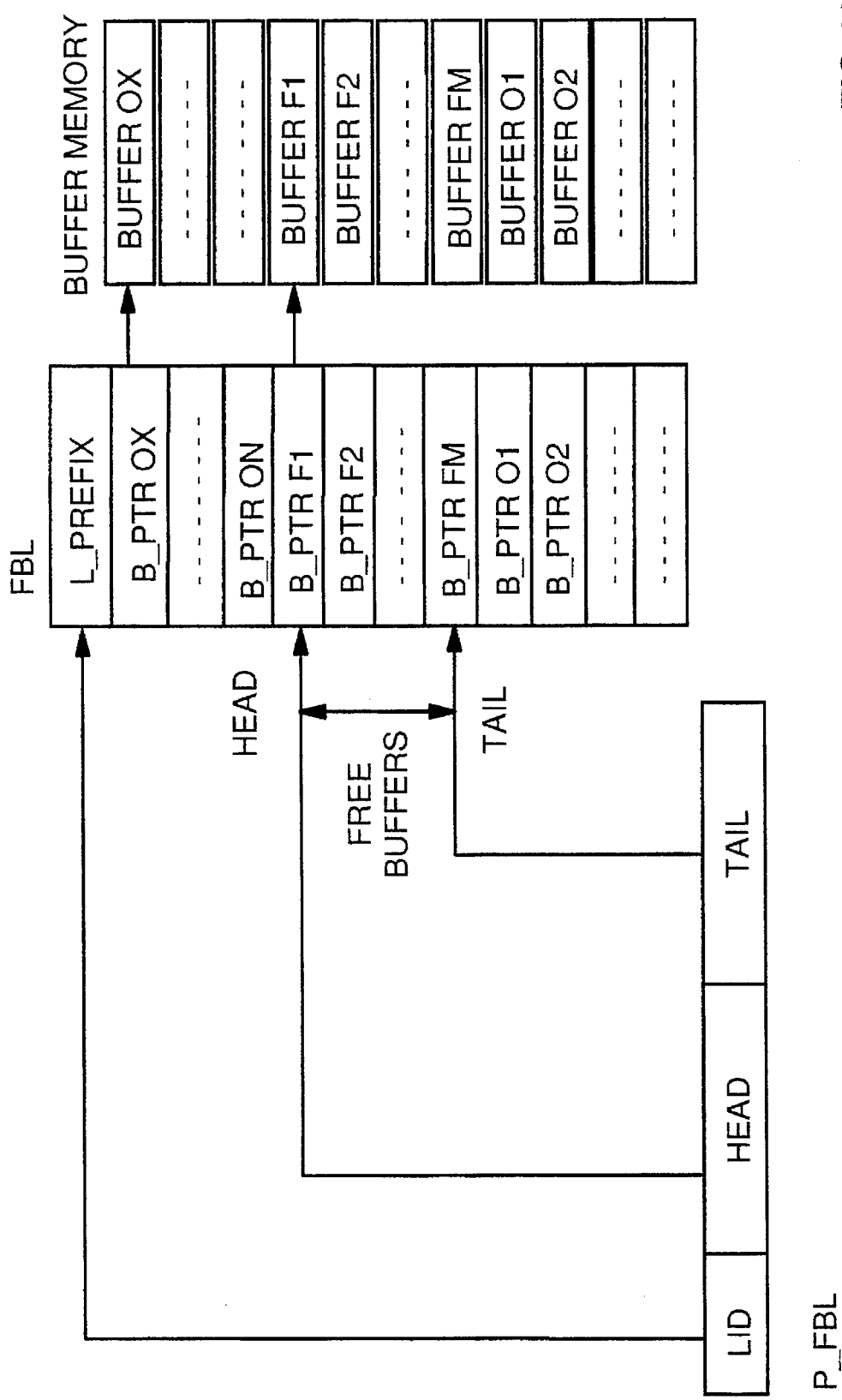
FIG. 12 represents the Free Buffer List structure according to the present invention.

The management of the Buffer Memory is realized by means of a specific list called Free Buffer List (FBL). The FBL comprises the totality of the Buffer Pointers and its role is to provide a status of the memory occupation (FIG. 12) using the HEAD and TAIL fields of the Free Buffer List Pointer (P_FBL):

T: total number of buffers in the Buffer Memory.

HEAD: identification of the first free buffer of the list. Each time a new buffer is filled, the HEAD field is incremented.

TAIL: identification of the next free buffer of the list. Each time a new buffer is released, the TAIL field is incremented.

HEAD=TAIL: the Buffer Memory is full.

Incremented TAIL=HEAD: the Buffer Memory is empty.

The Free Buffer List (FBL) is created at initiation time and is permanent contrary to other lists which are created dynamically (Buffer, Packet or Queue Lists).

Note: in general, when a lack of resources is detected (Free Buffer List empty), then the packet which cannot be stored in the Buffer Memory is discarded.

Free Packet List (FPL)

Buffer Lists are of fixed length (fixed number of elements). The management of these lists in the Local Memory (LM) is realized by means of a specific list called Free Packet List (FPL). The FPL is created at initiation time and is permanent like the Free Buffer List. It comprises all the Buffer List structures that will be dynamically created or released during the packet receive and transmission process.

It is important to note that, in the present invention, pointers (Buffer, Packet or Queue pointers) are simply stacked in predefined lists (FIG. 6). The pointers are not chained that means that pointers do not contain the address of the next pointer in the list and they are not aware of the location of this next pointer. This list structure is designed to optimize in term of performance the buffer manipulation in very high speed adapters but not the memory resources.

Specific Purpose Processor Structure

Figure 13:
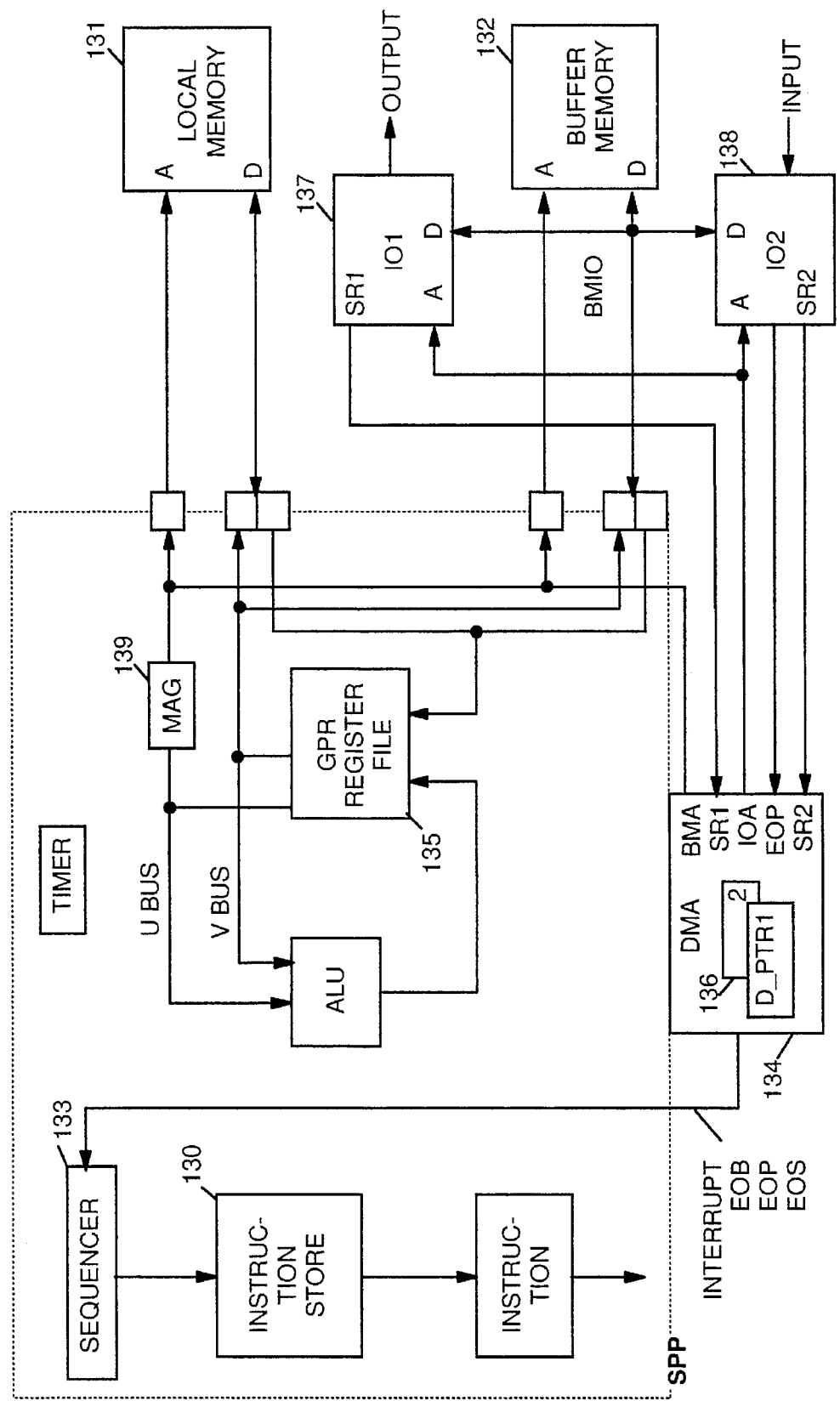
FIG. 13 represents the Processor functional structure according to the present invention.

The Specific Purpose Processor functional structure is illustrated in FIG. 13.

Processor Parallel Processing

The Specific Purpose Processor is designed to execute up to three operations in parallel:

1. ALU (Arithmetical and Logical Unit) operations on registers

2. Memory operations

3. Sequence operations

The parallelism requires to distinguish instructions from operations:

Instruction: it is the content of the code word. In term of assembler language, the instruction corresponds to one line of code. All instructions are executed in one processor cycle Operation: an instruction may be composed of one or more operations which are executed simultaneously.

Memory Space

The SPP memory space is divided in three blocks:

the Instruction Store (130),

The Local Memory (LM, 131), which is the code working space,

The Buffer Memory (BM, 132) which is the repository for data packets when they pass through the adapter.

They all operate in parallel, the Instruction Store (130) under control of the Sequencer (133), the Local Memory under control of the processor code and the Buffer Memory (132) under the control of the Direct Access Memory (DMA, 134)).

Registers

The registers are divided in two categories:

1. the General Purpose Registers (GPR)

These registers are located in the Register File (RF, 135) and are available as instruction operands.

2. the Control Registers (CR)

The CR's are hardware registers which are used in specific functions and are available also as instruction operands. However, there are less degree of freedom in their use, as compared with the GPR's. In particular, two of these control registers (136) are located in the Direct Access Memory (DMA, 134).

CR1=D_PTR1 (DMA Pointer IO1)
CR2=D_PTR2 (DMA Pointer IO2)

DMA Pointers 1 and 2 are associated to input/output IO1 (137) and IO2 (138) and they both contain the current Buffer Pointer (B_PTR).

Memory Address Generator (MAG, 139)

In all load or store operations, on the Local or on the Buffer Memory, the physical address is reconstituted from the different fields of Buffer or List Pointer, used as operand. For performance reason, this operation is realized by a specialized hardware component called Memory Address Generator (MAG,139).

Direct Memory Access Controller (DMA, 134))

The use of a Direct Memory Access Controller (DMA, 134) jointly with a processor is well-known in the state of the art. Its role is to quickly move the data packets between the IO devices (137, 138) and the Buffer Memory (132) without the processor (SPP) intervention. The DMA module consists of two independent programmable channels. The IO devices present their service requests (SR1, SR2) to the DMA which controls the access to the Buffer Memory (132). The processor intervention is needed only at buffer and packet boundaries. The data streams between the two IO devices and the Buffer Memory is processed in parallel with the code. Up two IO operations can be multiplexed on the BMIO bus; one with IO1 and the other with IO2. For that the DMA manages the two DMA Pointers (D_PTR1 and D_PTR2) which are nothing else than Buffer Pointers.

Input Output Subsystems

The Specific Purpose Processor (SPP) is considered as the "master" and it establishes the connections.

The IO devices and the Buffer Memory are controlled either directly by the processor code, or via the DMA.

The code intervention can be forced by the IO devices via the Interrupt mechanism in case of buffer or packet boundary.

Data Reception and Transmission

Various processing can be made on Buffer and List Pointers:

Incrementing a Buffer Pointer,
Closing a buffer,
Accessing a List Prefix,
Attaching an element to a list,
Detaching an element from a list.

Operations on Pointers

Some operations on pointers are performed by the processor code, others by the Direct Memory Access (DMA).

The writing and reading of the Buffer Pointers is exclusively the fact of the DMA (134).

The writing in the Buffer Memory: At the reception of a service request (SR2) from an IO2, the DMA has access to the Buffer Memory (132) by means of the address contained in the Pointer 2 (D_PTR2, 136). The DMA Pointer 2 is provided by the processor (SPP) and is nothing else than a Buffer Pointer (B_PTR). The DMA orders simultaneously the IO2 (138) to present a data element on the BMIO bus and the Buffer Memory (132) to write this data element in the buffer identified by the DMA Pointer. Data are filled into the buffer starting an address chosen by the code and ending at the bottom of the buffer except the last buffer (of a packet) where data may end at any place. When the buffer is full, the DMA demands from the processor a new Buffer Pointer through an interrupt mechanism (IO2_EOB routine). A similar procedure is used when the IO2 detects the end of a packet (IO2_EOP routine)).

The Reading in the Buffer Memory: At the reception of a service request (SRI) from an IO1, the DMA addresses the Buffer Memory (132) by means of the DMA Pointer 1 (D_PTRI, 136). The DMA Pointer 1 is provided by the processor (SPP). The DMA orders simultaneously the Buffer Memory (132) to present on the BMIO bus a data element in the buffer identified by the DMA Pointer and the IO1 device (138) to read this data element. When the buffer is empty, the DMA demands a new Buffer Pointer from the processor through an interrupt mechanism (IO1_EOB routine). A similar procedure is used when the DMA detects a end of packet (IO1_EOP routine). After the data transfer, the Buffer Pointer is released in the Free Buffer List, Packet List and Queue List are updated accordingly.

Packet and Queue Pointers are managed by the processor code:

the Code intervention is forced by the IO devices and DMA via the Interrupt mechanism in case of buffer or packet boundary.

the buffer and packet queueing and dequeueing mechanisms are executed under the control of the processor in the Local Memory.

Interrupts

The Interrupt mechanism is the way real time is supported by the Specific Purpose Processor (SPP). An Interrupt is a break, due to particular events, in the normal sequence of the processor code. The events which can cause this Interrupt are the service requests from the IO devices associated with specific conditions such as end of buffer, end of packet . . . . At each specific Interrupt corresponds a specific routine which cannot be interrupted by another routine. It is very important to have interrupt routines as short as possible to avoid overrun/underrun problems.

1. The following Interrupts are used by the Line and Switch Transmitters (IO1).

IO1_EOB:

Condition: when serving an output IO1, the DMA has emptied a buffer (which is not the last buffer of the packet/segment—the Buffer Pointer is not flagged EOS or EOP) the DMA Pointer (D_PTR1) raises a IO1_EOB interrupt which triggers a IO1_EOB routine.

Routine: this routine releases the pointer of the just emptied buffer in the Free Buffer List. A new pointer is dequeued from the Output Buffer List (OB_LIST) and passed to the DMA Pointer (D_PTR1).

IO1_EOP:

Condition: when serving an output IO1, the DMA has emptied a packet (the last buffer of a packet which pointer contains the EOP flag ON), the DMA Pointer (D_PTR1) raises a IO1_EOP interrupt which triggers a IO1_EOP routine.

Routine: the routine:

releases the current and last Buffer Pointer of the Output Buffer List (OB_LIST) in the Free Buffer List (FBL).

releases the current Packet Pointer in the Free Packet List (FPL)

detaches the current Output Packet Pointer (OP_PTR) from the Output Packet List (OP_LIST).

dequeues the next packet and its pointer from the Output Packet List

2. These Interrupts are used by the Line and the Switch Receiver (IO2).

$IO2_{13}$ EOB:

Condition: when serving an input IO2, the DMA has detected a Buffer Full condition (That buffer is not the last buffer of a packet), the DMA Pointer (D_PTR2) raises a IO2_EOB interrupt which triggers a IO2_EOB routine.

Routine this routine:

stores the pointer of the just filled up buffer in a pre-allocated Input Buffer List (IB_LIST) where all buffers of the same packet are stacked.

updates the Input Buffer List Prefix area.

provides the DMA Pointer (D_PTR2) with a new Buffer Pointer for continuing the reception of the data of the same packet. Free Buffer Pointers are managed by the Free Buffer List (FBL).

when for the same packet, the Buffer List is full, the segmentation takes place.

IO2_EOP:

Condition: when serving an input IO2, the DMA has completed the reception of a packet (the last buffer of the packet which pointer is flagged EOP by the hardware), the DMA Pointer raises a IO2_EOP interrupt which triggers a IO2_EOP routine. The code intervention is required to provide a new Buffer Pointer for the reception of a new packet.

Routine: this routine:

stores the pointer of the last filled buffer in a pre-allocated Input Buffer List (IB_LIST) where all buffers of the same packet are automatically stacked. The last Buffer Pointer of a packet is flagged EOP by the DMA Pointer (D_PTR2).

updates the Input Buffer List Prefix area.

the Packet Pointer of the Input Buffer List is queued in the Input Packet List (IP_LIST).

provides the DMA Pointer (D_PTR2) with a new Buffer Pointer (B_PTR) for the reception of the next packet.

Point-to-Point and Multi-Point Routing

Multicasting means a packet should be sent to at least two destinations:

to different Transmit Adapters (via the Switch) in a Receive Adapter and when needed to the General Purpose Processor (GPP).

to output Trunks or Ports in a Transmit Adapter and when needed to the General Purpose Processor (GPP).

The general principles of the point-to-point and multi-points routing according to the present invention can be summarized as follows:

Data packets are never copied, only Packet Pointers are copied for each destination:

Space in Buffer Memory is saved.

The number of instructions required for the background (delayed) process is significantly reduced improving the packet throughput (number of packets per seconds that the adapter is able to transmit).

The routing is independent of the packets length.

No overhead generated by the multicasting mechanism in the interrupt (real time) procedures.

The underrun/overrun problems on the output device IO1 are reduced.

The efficiency of the adapter in term data throughput (bits per second) is significantly improved.

Each output is processed independently by means of interrupt (real time) routines:

Lines are managed in real time.

Lines of different speed or protocol can be supported in parallel.

The release of the resources is entirely realized on a no priority mode in the background (delayed) process.

Output Queues

Each destination has its own Output Queue where the packets waiting for transmission are stacked. The number of queues is limited to the number of destinations:

In the Receive Adapter (401), there is one Output Queue per adapter on the Switch (403) plus one specific Output Queue dedicated to the General Purpose Processor (GPP, 409).

Likewise in the Transmit Adapter (402), there is one Output Queue per Trunk or line in output of the Line Interface (416) plus one specific Output Queue dedicated to the General Purpose Processor (GPP, 409).

The Output Queues are located in the Local Memory (131). They are managed by the Specific Purpose Processor (SPP) by means of the background and interrupt (EOB, EOP) procedures detailed in flow charts of FIGS. 15, 16 and 17.

Output Queue Table

Figure 10:
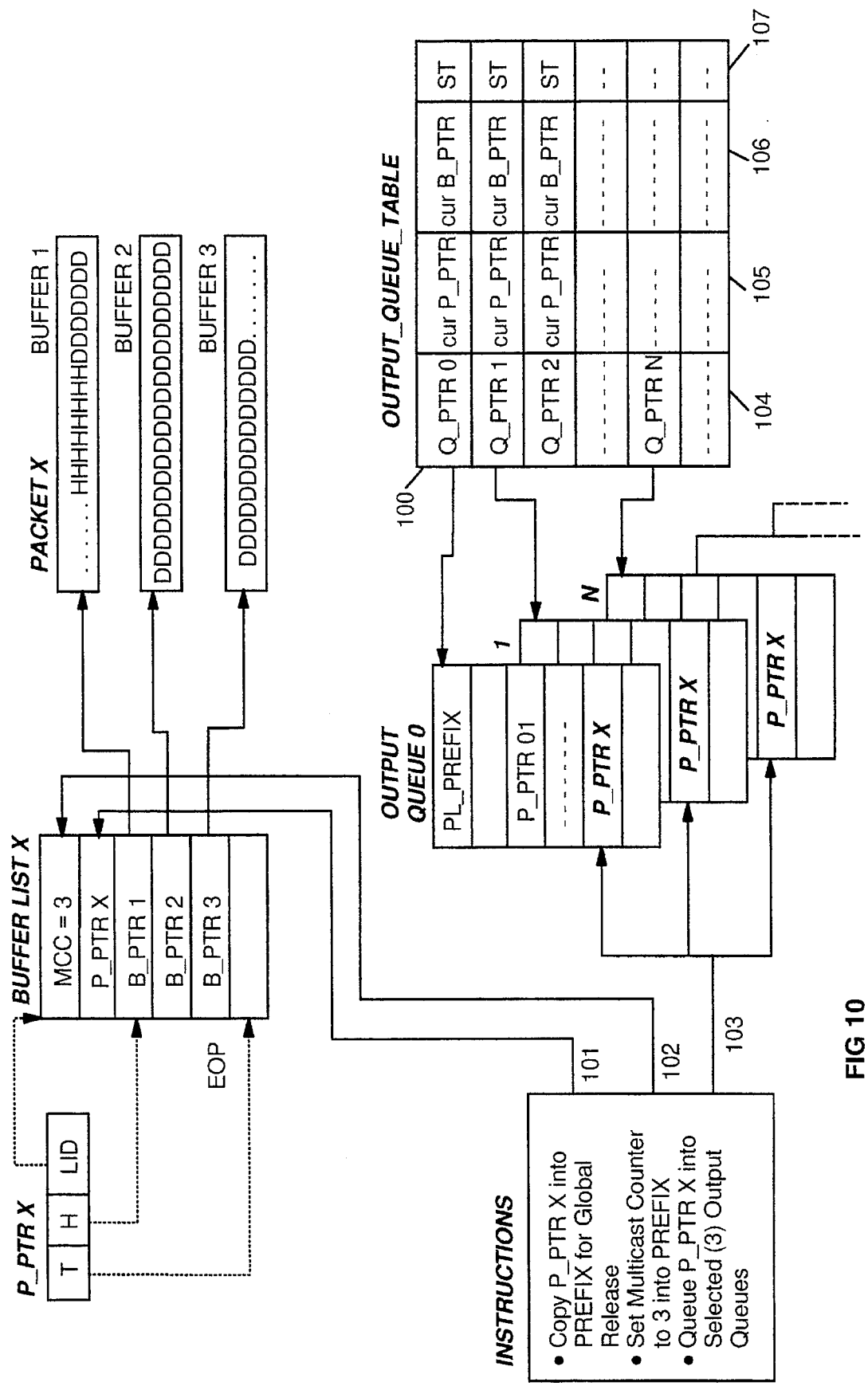
FIG. 10 shows an overview of the multicast mechanism as claimed in the present invention.

As shown in FIG. 10, during the transmission of the data packets, the state of each Output Queue is stored in a specific table called Output Queue Table (100). Each Output Queue is represented by one record comprising:

the Queue Pointer (104)(Q_PTR) identifying the queue.

the Current Packet Pointer (105) (cur P_PTR) identifying, when the Output Queue is ACTIVE, the packet to transmit.

the Current Buffer Pointer (106) (cur B_PTR) identifying, when the Output Queue is ACTIVE, the buffer to transmit.

the state (107) (ST) of the Output Queue:

ACTIVE state: a START TRANSMISSION has been sent to the IO1. The packet identified by the Current Packet Pointer (cur P_PTR) is transmitted from the Buffer Memory to the selected output under the control of the DMA.

NON ACTIVE state: the transmission of the previous packet is terminated and the Output Queue is empty.

Packet Processing

Figure 14:
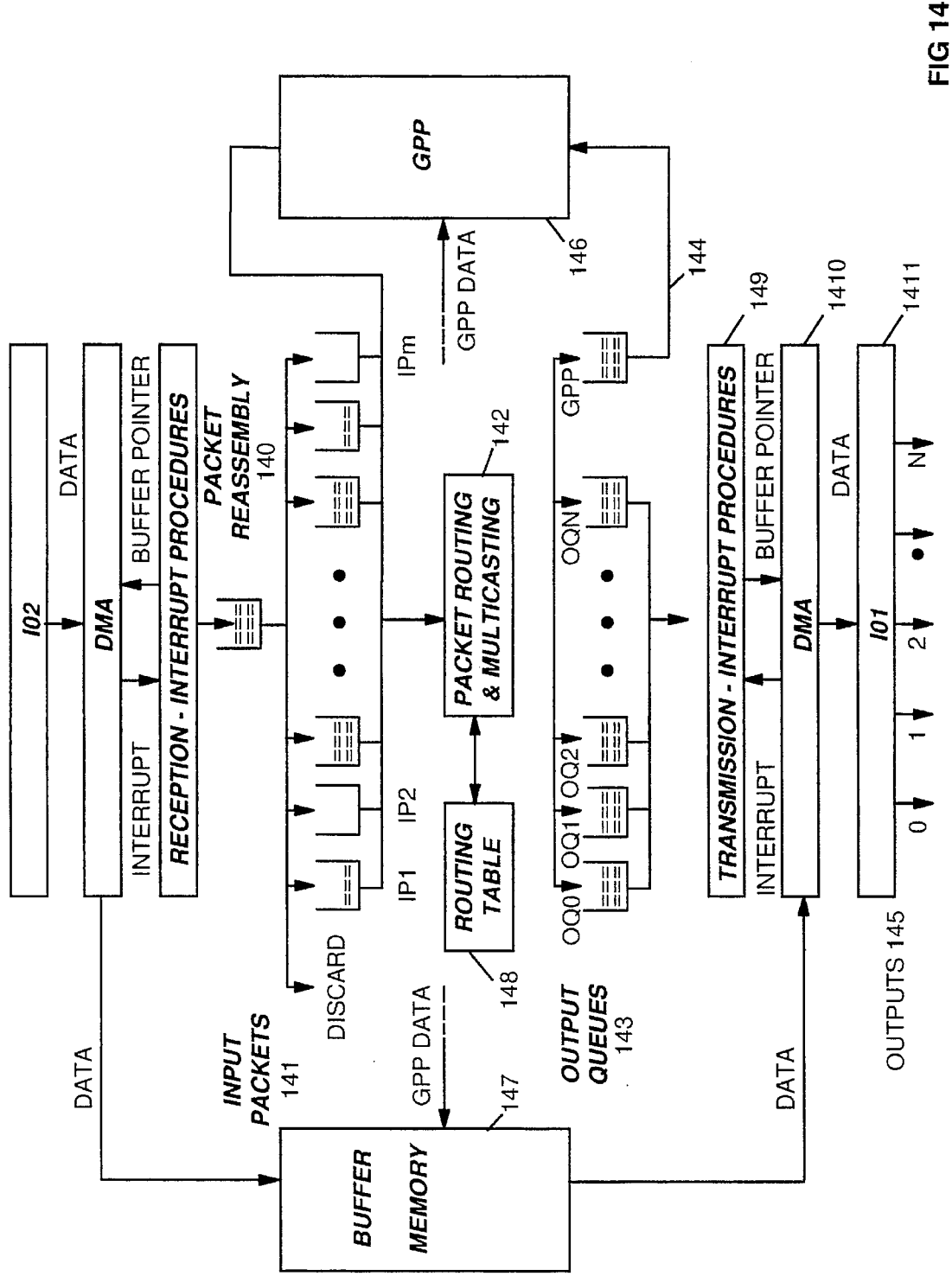
FIG. 14 shows a general view of the packet processing in the programmable adapter according to the present invention.

FIG. 14 gives a general view of the packet processing mechanism in a programmable high speed adapter. The receive, routing and transmission process involves the steps of:

(140) Reassembling each packet received in an Input Buffer List and initializing the Buffer List Prefix with the routing information. Packets in error are discarded.

(141) Creating for each packet a specific Buffer List identified by a Packet Pointer (IP1 . . . Ipm).

(142) Processing the packets according to their routing mode with a local access to a Routing Table (148).

(143) Queueing the Packet Pointers in the Output Queues (OQ1 . . . OQN) corresponding to the destination of the packets (145). Packets intended for the GPP (146) are stacked in a specific Output Queue (144)

(149) Triggering an interrupt routine each time a new buffer is requested. Interrupts are triggered asynchronously by the DMA on the occurrence of specific events: End Of Buffer (EOB), End Of Packet (EOP).

(1410) Transmitting the data from the Buffer Memory (BM,147) to the output device (IO1) under the control of the DMA.

(1411) Scanning the outputs (145).

Background Procedure

Figure 15:
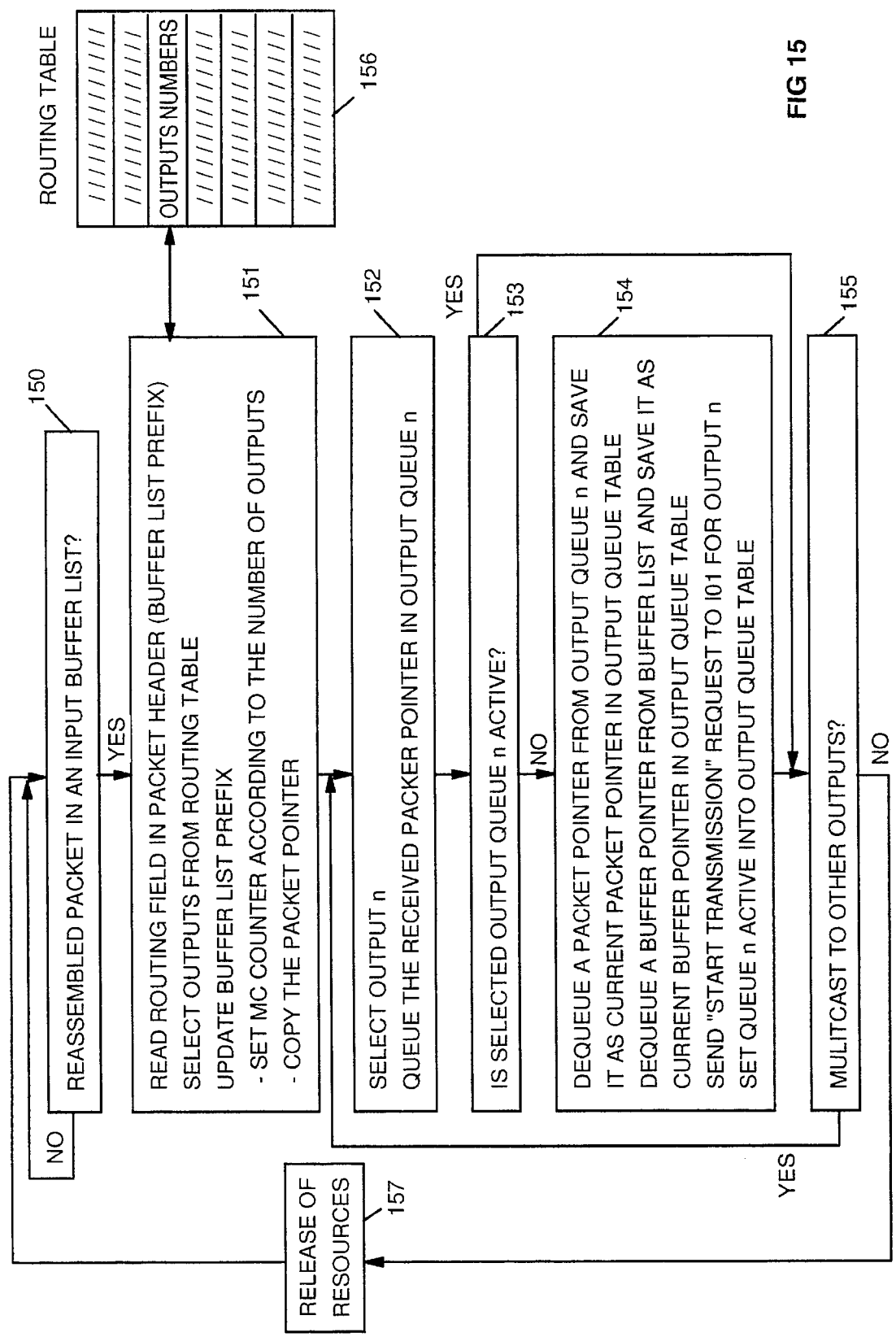
FIG. 15 shows the packet routing and multicasting process according to the present invention.

FIG. 15 is a flow chart illustrating the the packet routing and multicasting procedure represented in FIG. 14 (142):

(150) The processor waits for the next reassembled packet.

(151) As soon a packet is ready to be processed, its Packet Pointer (P_PTR) is retrieved. The Buffer List Prefix identified by said Packet Pointer (P_PTR) is updated. FIG. 10 details the different elements of the routing mechanism:

(102) The determination of the different destinations is given through a Routing Table (156) accessed by the Routing Field (802) of the packet header. In case of multi-points routing, Multicast Trees are predefined in each nodes at the connection set-up. Routing Tables (156) are maintained dynamically. That means that when a new connection is established or an old one is terminated the tables are updated (the database of network topology can of course be maintained quite separately). The Multicast Counter (MCC) in the Buffer List Prefix is set to its initial value according to the number of destinations given in the Routing Table (156). This value is equal to one for a point-to-point routing and superior to one for a multi-points routing mode.

(101) The Packet Pointer (P_PTR) (with the original HEAD and TAIL values) is saved in the Buffer List Prefix for a further release of the Buffers in the Buffer Memory.

(152) The Packet Pointer (P_PTR) corresponding to the packet to route or multicast is queued (the TAIL value of the Queue Pointer is incremented) in the first selected Output Queue (103).

(153) If the Output Queue is in an ACTIVE state, the process start again with with the next selected Output Queue (if any).

(154) If the Output Queue is in an NON ACTIVE state (ST), the first Packet Pointer of the Output Queue is dequeued (the HEAD value of the Queue Pointer is incremented) and saved as Current Packet Pointer (cur P_PTR) in the Output Queue Table. Likewise, the first Buffer Pointer (B_PTR) of the corresponding Buffer List is dequeued (the HEAD value of the Packet Pointer is incremented) and saved as Current Buffer Pointer (cur B_PTR) in this same Output Queue Table. Then, the Specific Purpose Processor (SPP) sends to the IO1 a request to start the transmission of the Current Packet (START TRANSMISSION). The Output Queue is set in an ACTIVE state (ST) in the Output Queue Table. The process goes on with the next selected Output Queue (if any).

(155) When all the selected outputs have been successively processed the packet routing and multicasting procedure releases all resources attached to the packets and buffers already transmitted (157). It is important to note that this release takes place in the background procedure without overloading the interrupt procedures.

(150) Once the release terminated the procedure returns to its initial waiting state.

Interrupt Procedures

1. Packet Level (IO1_EOP)

Figure 16:
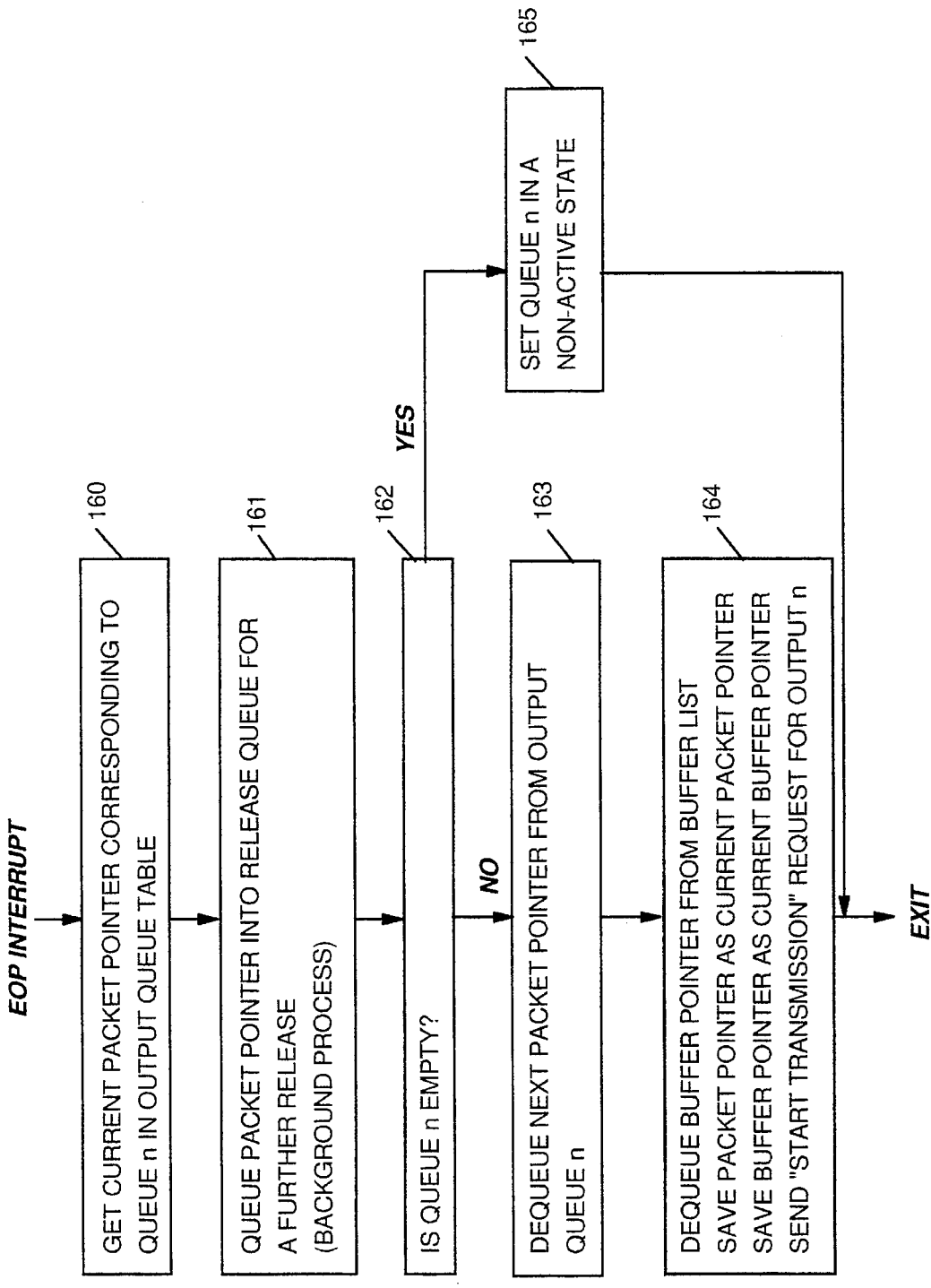
FIG. 16 shows the interrupt procedure at packet level according to the present invention.

FIG. 16 is a flow chart illustrating the interrupt procedure at the packet level as represented in FIG. 14 (149). On the occurrence of an End Of Packet interrupt (EOP):

(160) The Current Packet Pointer (cur P_PTR) corresponding to the last Output Queue processed (OQn) is extracted from the Output Queue Table.

(161) The Current Packet Pointer is queued in a Release Queue for a further release of the Packet Pointer in the Free Packet List and of the Buffer Pointers in the Free Buffer List. This release process is entirely realized in the background procedure (157) to reduce to a minimum the number of instructions in the interrupt procedures.

(162) The contents of the Output Queue (OQn) is tested:

(165) If Output Queue (OQn) is empty, then it is set in a NON ACTIVE state (ST) in the Output Queue Table.

(163) If Output Queue (OQn) is not empty, then the next Packet Pointer is dequeued (the HEAD value in the Queue Pointer is incremented) (166). The first Buffer Pointer of the Buffer List is dequeued (the HEAD value of the Packet Pointer is incremented) and saved (Current Buffer Pointer) in the Output Queue Table with the Packet Pointer (Current Packet Pointer). Once the Current Buffer Pointer (cur B_PTR) and the Current Packet Pointer (cur P_PTR) are identified, the Specific Purpose Processor (SPP) sends to the IO1 a request to start the transmission of the Current Packet (START TRANSMISSION).

2. Buffer Level (IO1_EOB)

Figure 17:
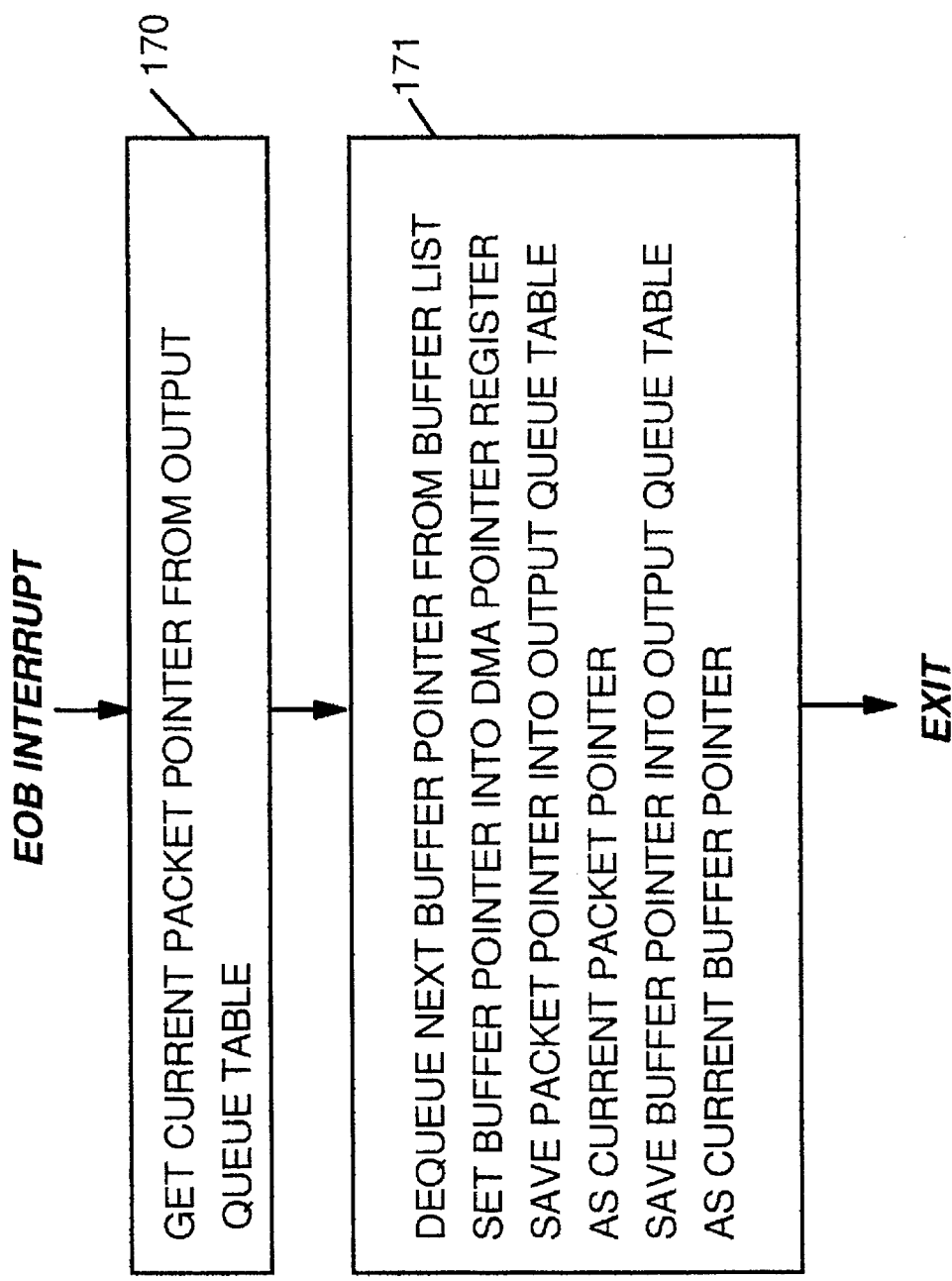
FIG. 17 shows the interrupt procedure at buffer level according to the present invention.

FIG. 17 is a flow chart illustrating the interrupt procedure at the buffer level as represented in FIG. 14 (149). On the occurrence of an End Of Buffer interrupt (EOB):

(170) The Current Packet Pointer (cur P_PTR) corresponding to the last Output Queue processed (OQn) is extracted from the Output Queue Table.

(171) The next Buffer Pointer (B_PTR) in the Buffer List is dequeued (the HEAD value of the Packet Pointer is incremented) This Buffer Pointer is first, set into the DMA Pointer (D_PTR1) attached to the IO1 device and second, saved as Current Buffer Pointer (cur B_PTR) in the Output Queue Table. The Packet Pointer is also saved in the Output Queue Table as Current Packet Pointer.

Release of Resources

Figure 19:
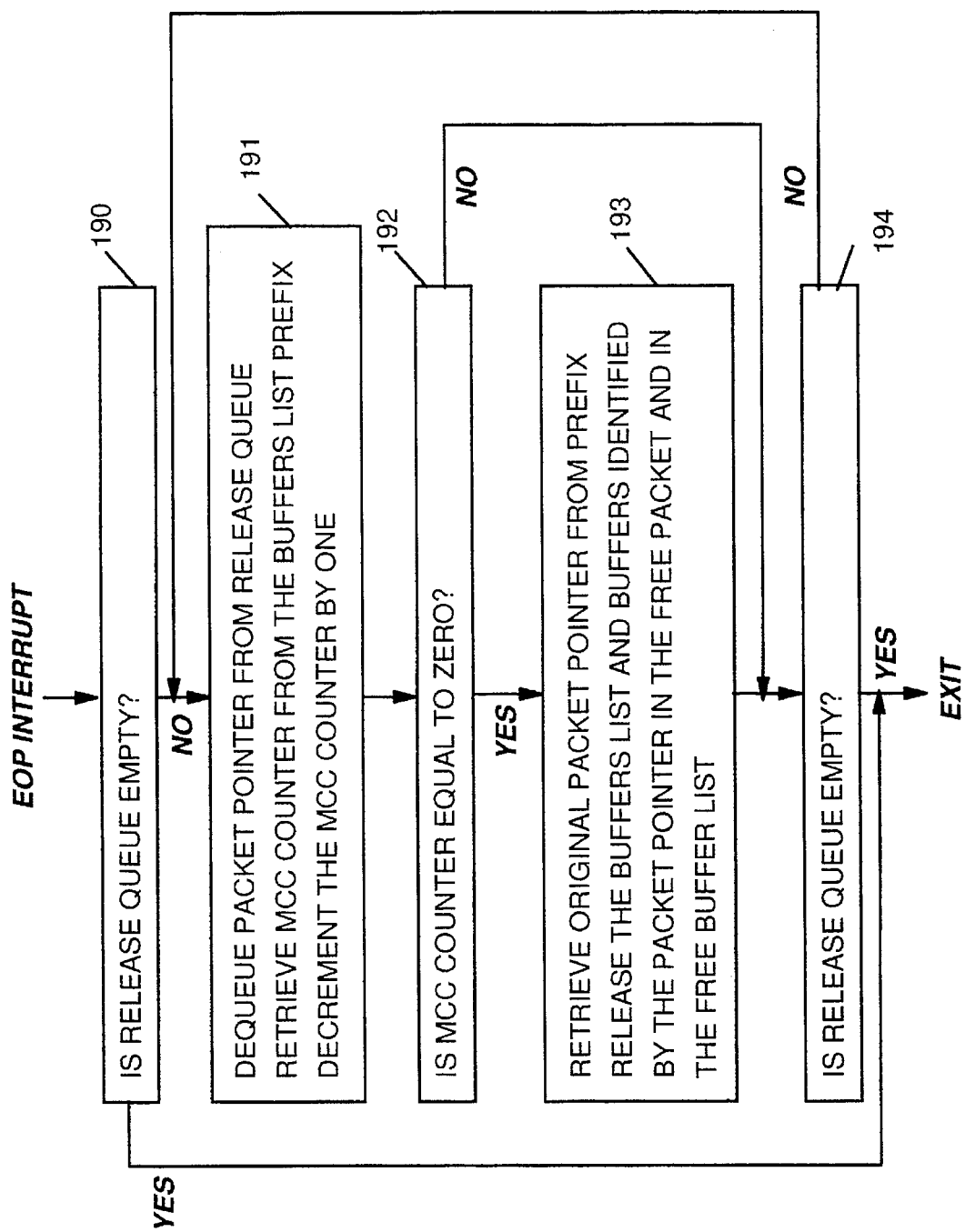
FIG. 19 is a flow chart illustrating the release mechanism of the memory resources in the background procedure as claimed in the present invention.

FIG. 19 is a flow chart illustrating the release of the resources attached to the packets after their transmission as represented in FIG. 15 (157). This process is entirely located in the background procedure to minimize the number of instructions during the interrupts.

(190) The contents of the Release Queue located in the Local Memory (131) is tested:

If the Release Queue is empty, the release process is terminated and the background procedure can return in its initial waiting state (150).

If the Release Queue is not empty then:
 (191) A Packet Pointer is dequeued from the Release Queue (the HEAD value of the Release Queue Pointer is incremented).
 (191) The Multicast Counter (MCC) is retrieved from the Buffer List Prefix.
 (191) The Multicast Counter (MCC) is decremented by one and tested (192):
  (193) If the Multicast Counter (MCC) value is equal to zero, then the transmission of the packet is terminated. All the resources attached to this packet must be released. The original Packet Pointer (P_PTR) (with the initial HEAD and TAIL values) previously saved is retrieved from the Buffer List Prefix. The Packet Pointer and Buffers Pointers are released respectively from the Free Packet List (FPL) and from the Free Buffer List (FBL).
  If the Multicast Counter (MCC) value is not equal to zero, then the multicast process is not terminated.

(190) The contents of the Release Queue is tested one more time:
 If the Release Queue is not empty, the procedure goes on with a new Packet Pointer (191).
 If the Release Queue is empty, the release process is terminated and the background procedure can return in its initial waiting state (150).

Data Transmission

Figure 18:
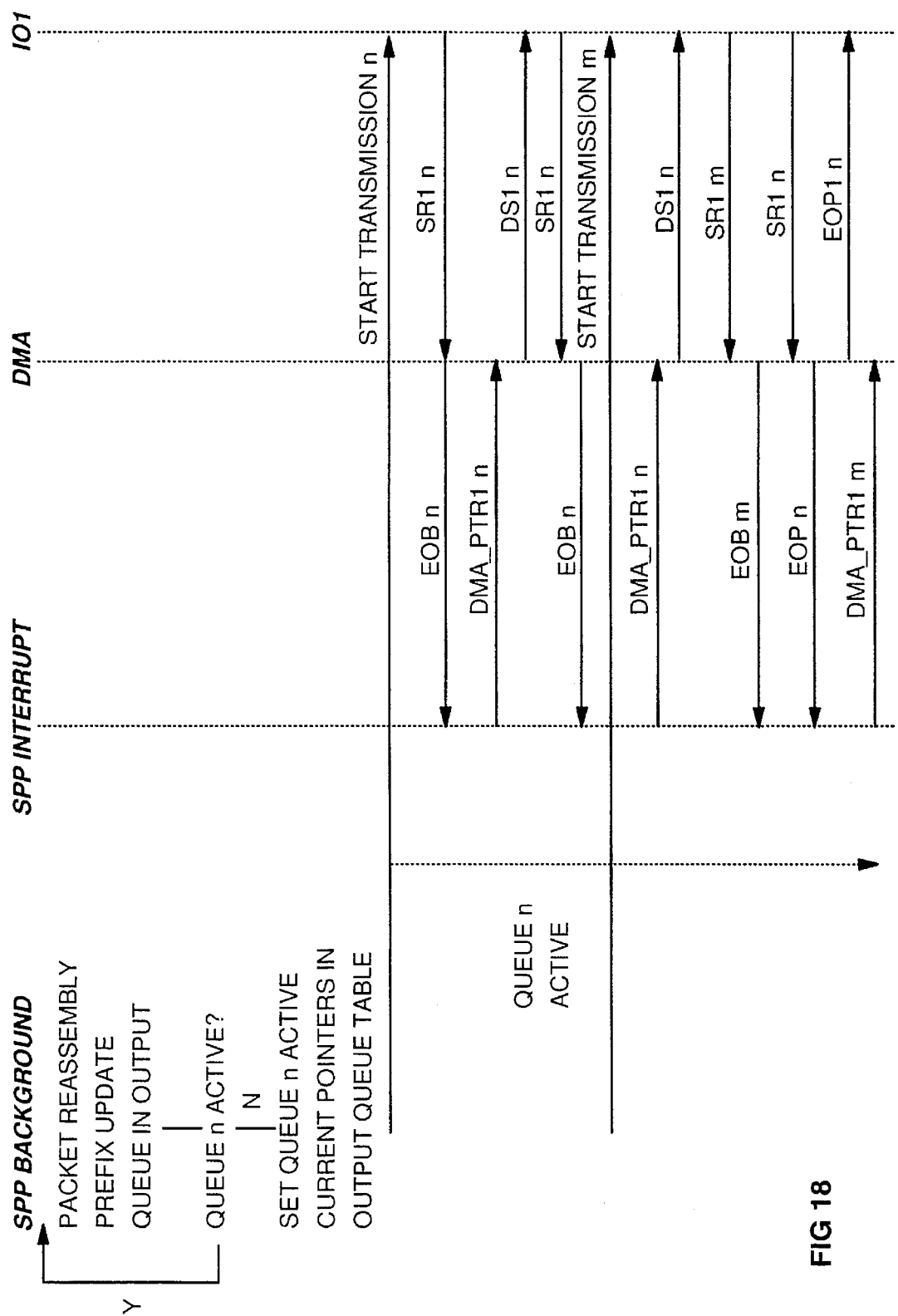
FIG. 18 illustrates the data flow between the Specific Purpose Processor (SPP), the Direct Access Memory (DMA) and IO1 device according to the present invention.

FIG. 18 illustrates the data flow between the Specific Purpose Processor (SPP), the Direct Access Memory (DMA) and IO1 device. First, the background procedure already described in FIG. 15 is in a waiting state. As soon as a packet is ready to be transmitted, the Packet Pointer is copied in the appropriate Output Queue n. This Output Queue n is set in an ACTIVE state and the SPP informs the IO1 device that it is ready to start the transmission on the output n (START TRANSMISSION n). At the reception of this message, the IO1 responds to the DMA with a Service Request (SR1 n) to request a first Buffer Pointer. the DMA triggers an End Of Buffer interrupt (IO1_EOB n as shown in FIG. 17) to extract from the Output Queue Table the Current Buffer Pointer (cur B_PTR n) of the Output Queue n. The DMA orders simultaneously the Buffer Memory (BM) to present the buffer identified by said Current Buffer Pointer on the BMIO and the IO1 to read this buffer (DS1 n Data Service message). The process goes on with the next buffer until the end of the packet. At this time the DMA raises an End Of Packet interrupt (IO1_EOP n as shown in FIG. 16) and informs the IO1 device (EOP1 n).

It is important to notice that all Output Queues are processed independently and in parallel under control of the IO1 device according to the different protocols and speeds used on the output lines.

We claim:

1. A line adapter for a packet switching node in a communication network, including a programmable processing means (SPP) for receiving and transmitting data packets of fixed or variable length to one or more outputs, said line adapters comprising:

a first storing means for buffering each data packet in one or more buffers;

means for identifying said buffers, a second storing means including means for queuing said buffer identifiers in buffer lists, each buffer list identifying a data packet;

means for identifying said buffer lists;

means for queuing, in said second storing means, buffer list identifiers in packet lists, each packet list identifying a queue;

means for identifying said packet lists;

means for processing a routing header of each data packet;

means for associating with each output an output queue for stacking the packet list identifiers of the data packets to transmit on said outputs;

means for routing the data packets to one or a plurality of outputs;

means for processing said routing header further comprising means for determining and selecting the output queue corresponding to the destination of each data packet;

said means for routing further comprising:

means for copying the buffer list identifier of the data packet to transmit in the output queue corresponding to said selected output;

means for handling each data request for said outputs in real time;

means for releasing said buffers in said first storing means, and said buffer identifiers and said buffer list identifiers from said second storing means;

said means for handling data requests further comprising means for handling independently the output queues, which further includes:

means for dequeuing in parallel the packet identifiers requested by the outputs; and means for dequeuing the buffer identifiers stacked in the buffer list identified by said packet identifiers.

2. The line adapter according to claim 1 wherein:

said first storing means includes means for writing and reading said data packets in buffers of fixed length independently of said programmable processing means; and said second storing means includes means for separately storing said buffer lists and said packet lists under control of said programmable processing means.

3. The line adapter according to claim 1 wherein said programmable processing means (SPP) comprises:

a background procedure for processing the data packets, a plurality of real time procedures triggered under control of each output to request the contents of a new buffer, said real time procedures being independent of the routing mode used.

4. The line adapter according to claim 3 wherein said means for releasing in said means for routing is executed in said background procedure.

5. The line adapter according to claim 1 wherein:

said means for identifying said buffers includes buffer pointers (B_PTR) identifying said buffers and stacked in one or more buffer lists (B_LIST);

said means for identifying said buffer lists includes packet pointers (P_PTR) identifying said buffer lists (B_LIST) and stacked in one or more packet lists (P_LIST); and said means for identifying said packet lists include queue pointers (Q_PTR) identifying said packet lists (P_LIST) and stacked in one or more queue lists (Q_LIST); and wherein each buffer list, packet list and queue list includes a prefix for storing information related to the data contained in said each buffer list, packet list and queue list.

6. The line adapter according to claim 5 wherein said buffer list prefix includes control and routing information contained in the data packet header.

7. The line adapter according to claim 6 wherein said buffer list prefix further includes a multicast counter (MCC COUNTER) and a packet pointer (P_PTR).

8. The line adapter according to claim 7 wherein a status of each output queue is stored in an output queue table located in said second storing means, said status including:

the output queue pointer (Q_PTR), a current packet pointer (cur P_PTR) for the last packet dequeued from the output queue;

a current buffer pointer (cur B_PTR) for the last buffer dequeued from the current packet pointer; and a state of the output queue depending on if the output queue is active, an output queue being active during the time said data packet identified by said current packet pointer is transmitted to said selected output.

9. The line adapter according to claim 8 wherein said background procedure includes:

means for detecting a new buffer list;

means for reading the routing information in the buffer list prefix;

means for initializing the multicast counter in the buffer list prefix with the number of outputs towards which the data packet must be transmitted;

means for copying the packet pointer of the buffer list in its own prefix;

means for selecting an output queue according to the destination of the data packet, queuing in said output queue the packet pointer and testing the state of said output queue, wherein:

if the state is active a new output queue is selected according to the other destinations of the data packet;

if the state is not active:

a packet pointer is dequeued from said output queue and saved as the current packet pointer in said output queue table;

a buffer pointer is dequeued from the buffer list identified by said current packet pointer and saved as the current buffer pointer in said output queue table;

a message is sent to the output;

the output queue is set in an active state; and a new output queue is selected according to the other destinations of the data packet;

when said packet pointer has been queued in all selected output queues the background process returns to its waiting state.

10. The line adapter according to claim 9 wherein said plurality of real time procedures comprise:

a first real time procedure triggered by the outputs on request for a new buffer including:

means for getting the packet pointer corresponding to the last output queue processed in the output queue table;

means for dequeing the next buffer pointer in the buffer list identified by said packet pointer;

means for saving said packet pointer into the output queue table as the current packet pointer;

means for saving said buffer pointer into the output queue table as the current buffer pointer;

a second real time procedure triggered by the outputs on request for a new packet including:

means for getting the packet pointer corresponding to the last output queue processed in the output queue table;

means for queuing said packet pointer in a release queue for a delayed release;

means for testing if the output queue is empty or not, wherein:

if said output queue is empty, said output queue is set in a non-active state;

if said output queue is not empty:

a next packet pointer is dequeued from said output queue;

said next packet pointer is saved as the current packet pointer in the output queue table;

a first buffer pointer of the buffer list identified by said packet pointer is saved as the current buffer pointer in the output queue table; and a message is sent to the output associated with said output queue.

11. The line adapter according to claim 1 wherein the management of the buffers in said first storing means is realized by means of a first permanent list (free buffer list) containing all of the buffer pointers.

12. The line adapter according to claim 1 wherein the management of the buffer lists in said second storing means is realized by means of a second permanent list (free packet list) containing all of the packet pointers.

13. The line adapter according to claim 1 wherein said releasing means in said background procedure comprises:

means for testing the contents of the release queue:

if the release queue is empty, then terminating the release;

if the release queue is not empty:

dequeuing a packet pointer from the release queue;

decrementing the buffer list prefix counter by one;

testing if the multicast counter value is equal to zero, if the multicast counter value is not zero, then testing the contents of the release queue:

if the release queue is empty, then terminating the release;

if the release queue is not empty, then dequeuing the next packet pointer from the release queue;

if the multicast counter value is zero:

retrieving the original packet pointer from the buffer list prefix identified by said packet pointer;

releasing the buffer list and buffers identified by said packet pointer from the free packet list and the free buffer list;

testing the contents of the release queue.

14. The line adapter according to claim 5 wherein each list pointer (packet pointer (P_PTR) or queue pointer (Q_PTR)) comprises:

a first field (LID) for identifying the list;

a second field for identifying a next pointer (TAIL) to stack in said list;

a third field for identifying a first pointer (HEAD) stacked in said list.

15. The line adapter according to claim 14 wherein said means for queuing comprises:

means for incrementing the TAIL field of the list pointer;

means for simultaneously storing the pointer identified by the TAIL field in the list identified by the LID field;

means for generating a list full indicator.

16. The line adapter according to claim 14 wherein said means for dequeuing comprises:

means for incrementing the HEAD field of the list pointer;

means for simultaneously reading the pointer identified by the HEAD field, in the list identified by the LID field;

means for generating a list empty indicator.

17. The line adapter according to claim 15 wherein said means for queuing further includes a means for testing said list full indicator, and said means for dequeuing further includes a means for testing said list empty indicator.

18. The line adapter according to claim 1 wherein said programmable processing means includes:

an arithmetical and logical unit, a register file, a sequencer, an instruction file, a direct memory access controller module, and a physical memory address generator.

19. A routing method in a line adapter for a packet switching node in a communication network, including programmable processing means (SPP) for receiving and transmitting data packets of fixed or variable length to one or more outputs, said routing method comprising the steps of:

buffering each data packet in one or more buffers in a first storing means;

identifying said buffers;

queuing, in a second storing means, said buffer identifiers in buffer lists, each buffer list identifying a data packet;

identifying said buffer lists;

queuing buffer list identifiers in packet lists in said second storing means, each packet list identifying a queue;

identifying said packet lists;

processing a routing header of each data packet;

associating with each output an output queue for stacking the packet list identifiers of the data packets to transmit on said outputs;

routing the data packets to one or a plurality of outputs;

said processing the routing header step further comprising the step of determining and selecting the output queue corresponding to the destination of each data packet;

said routing step further comprising the steps of:

copying the buffer list identifier of the data packet to transmit in the output queue corresponding to said selected output;

handling each data request for said outputs in real time;

releasing said buffers in said first storing means, and said buffer identifiers and buffer list identifiers from said second storing means;

said handling each data request step including the step of handling independently the output queues by dequeuing in parallel the packet identifiers requested by the outputs; and dequeuing the buffer identifiers stacked in the buffer list identified by said packet identifiers.

* * * * *